INVENTOR
WARREN W. DRUMMOND

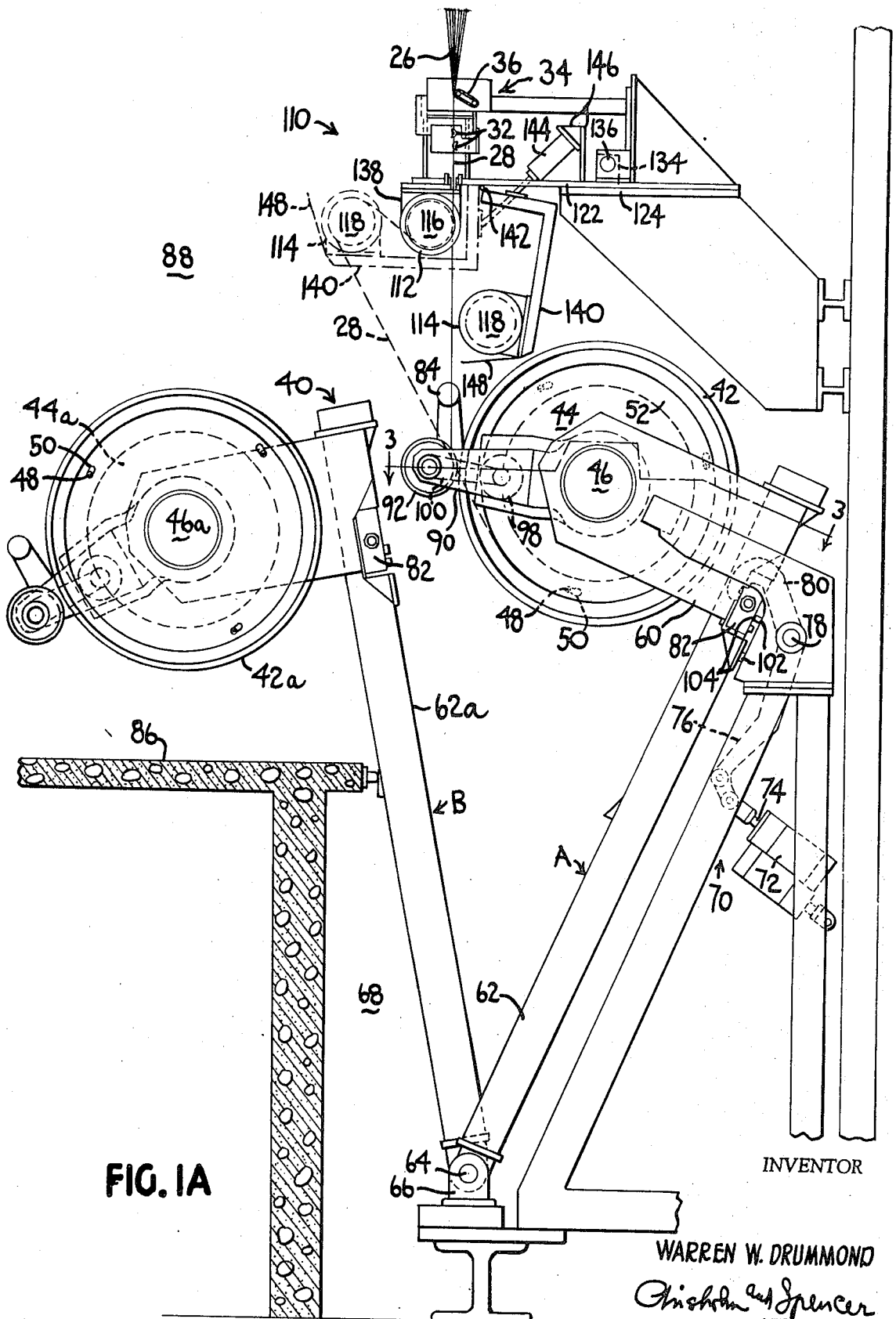
FIG. IA
INVENTOR
WARREN W. DRUMMOND
Chisholm and Spencer
ATTORNEYS

BY Chisholm and Spencer
ATTORNEYS

INVENTOR
WARREN W. DRUMMOND
BY
Chisholm and Spencer
ATTORNEYS

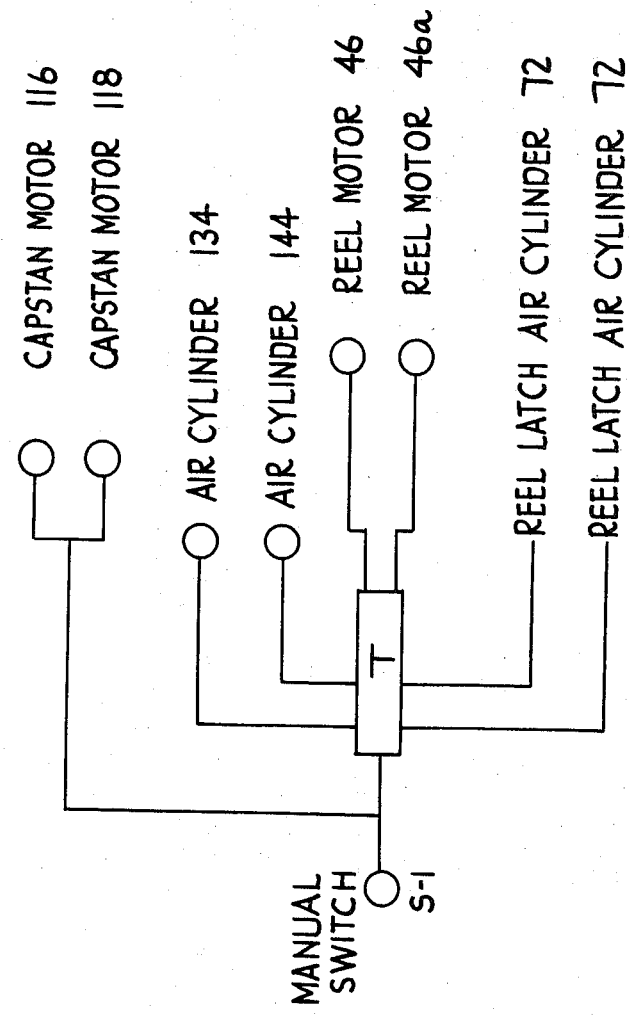
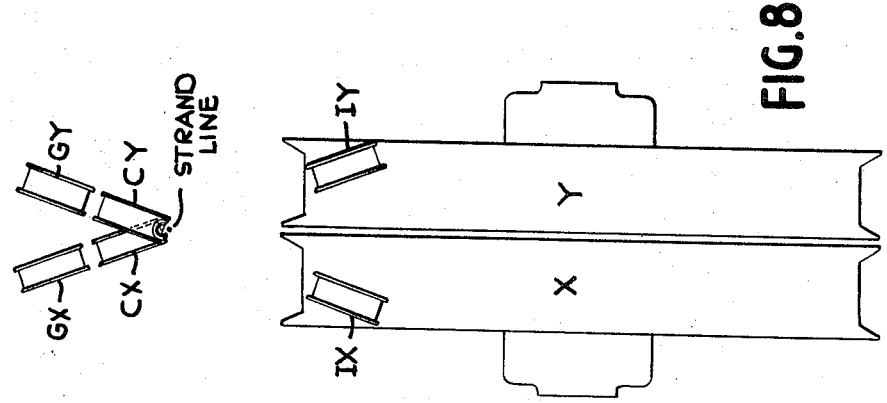

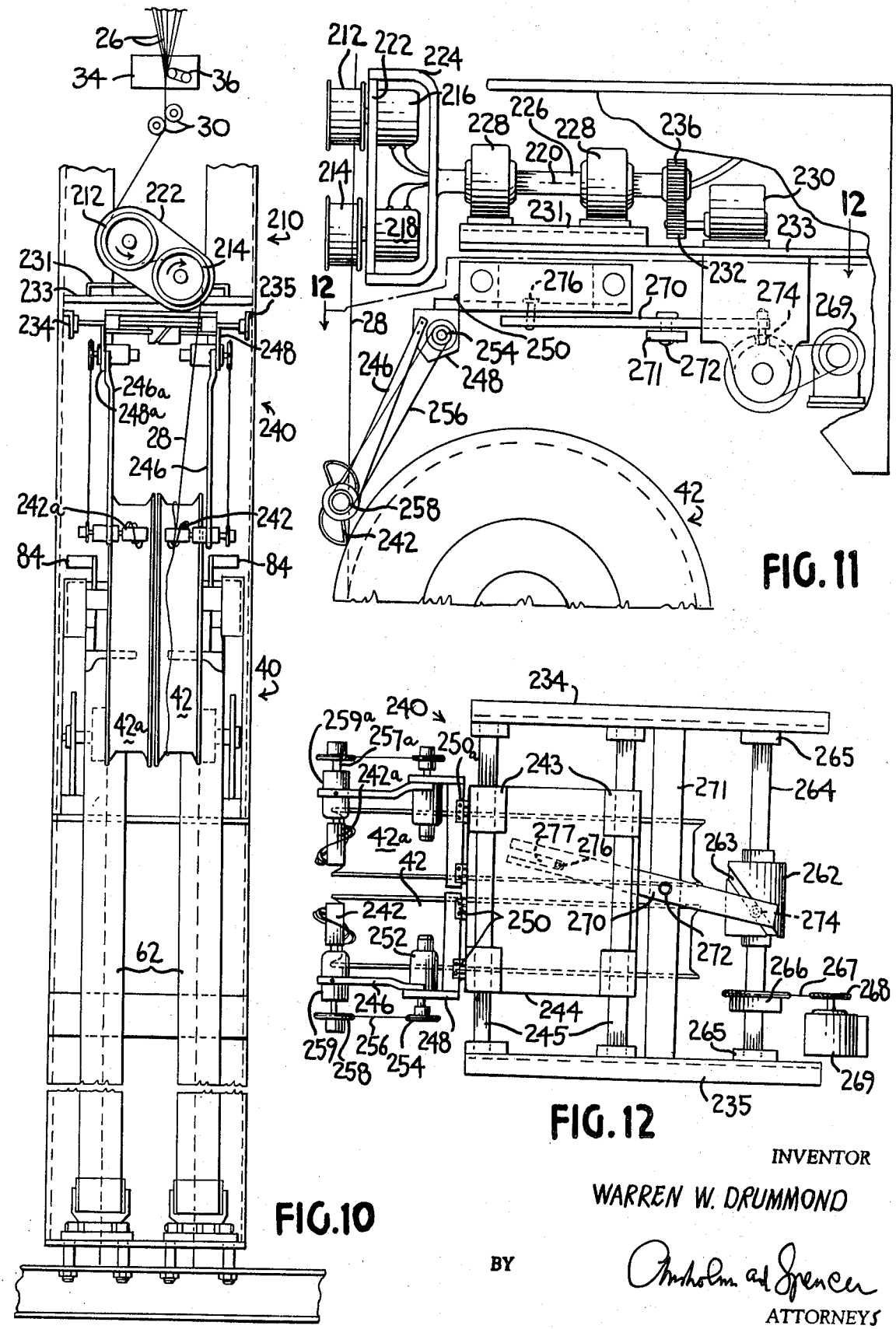

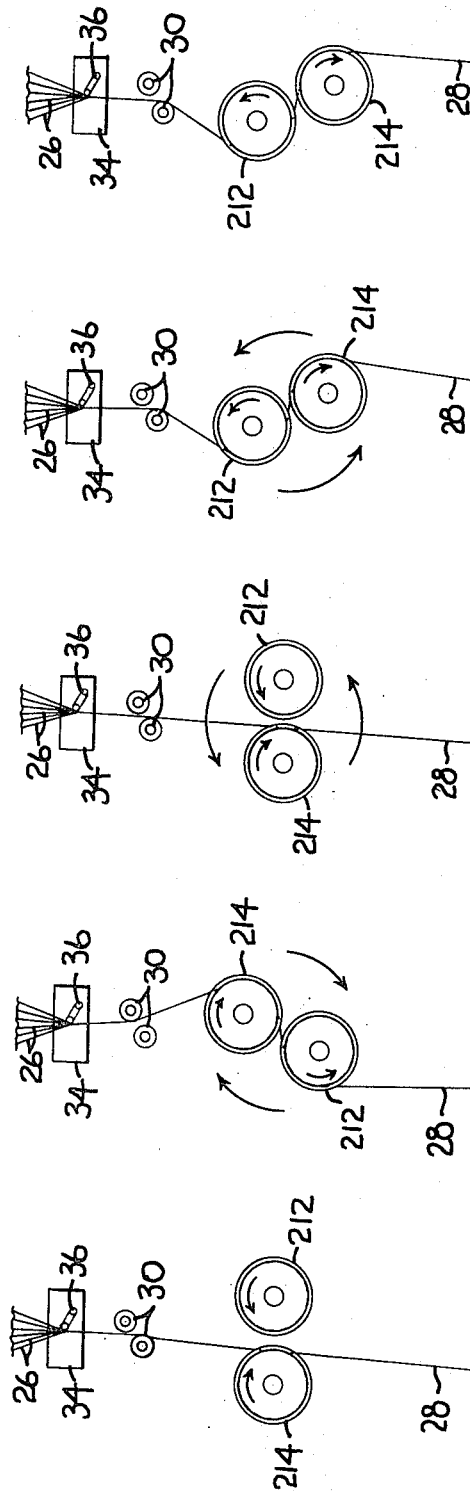

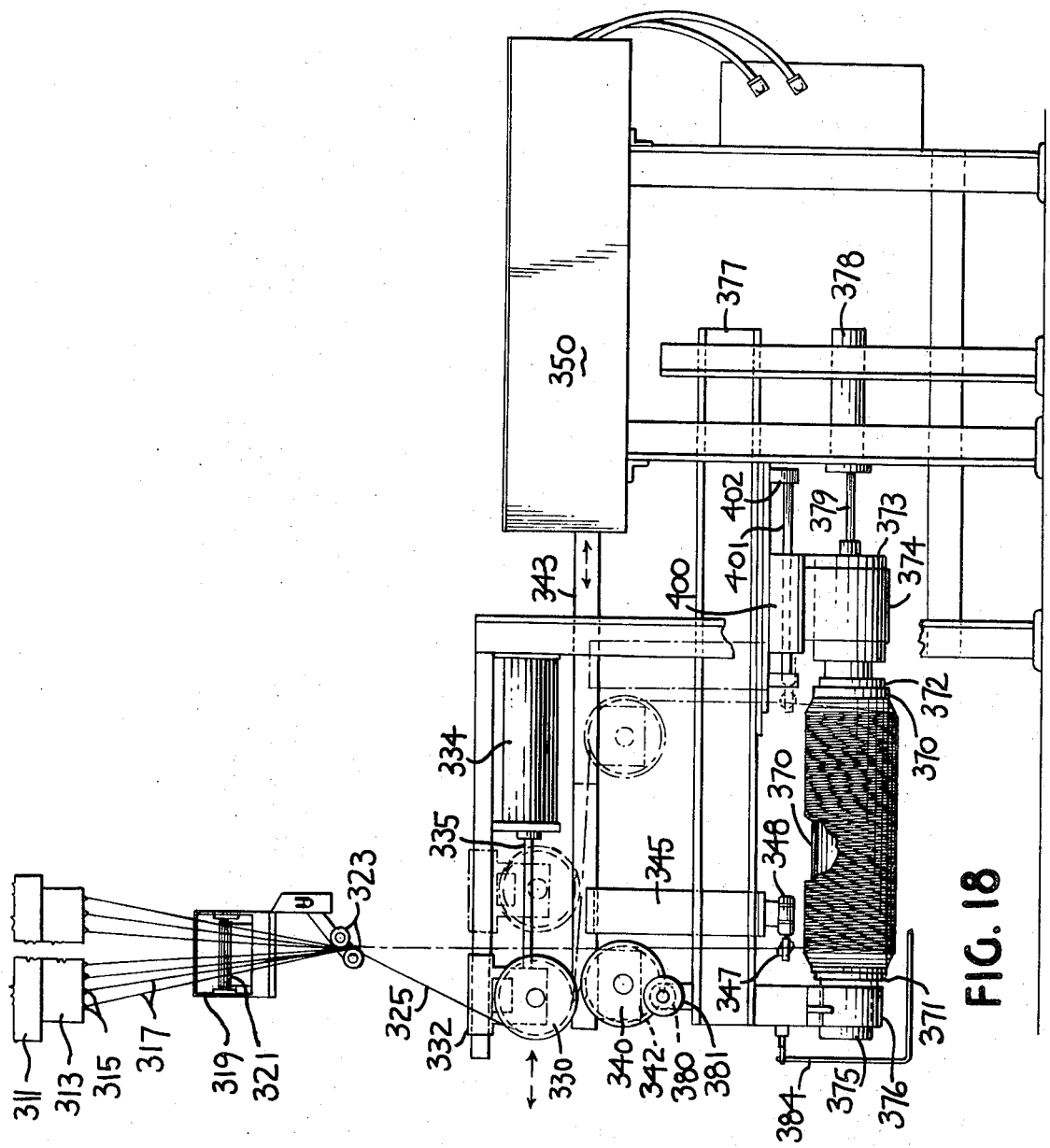

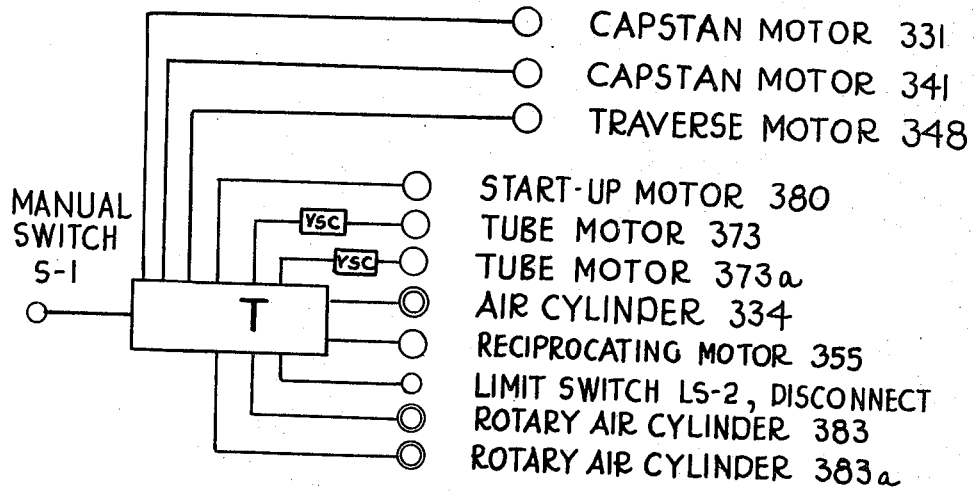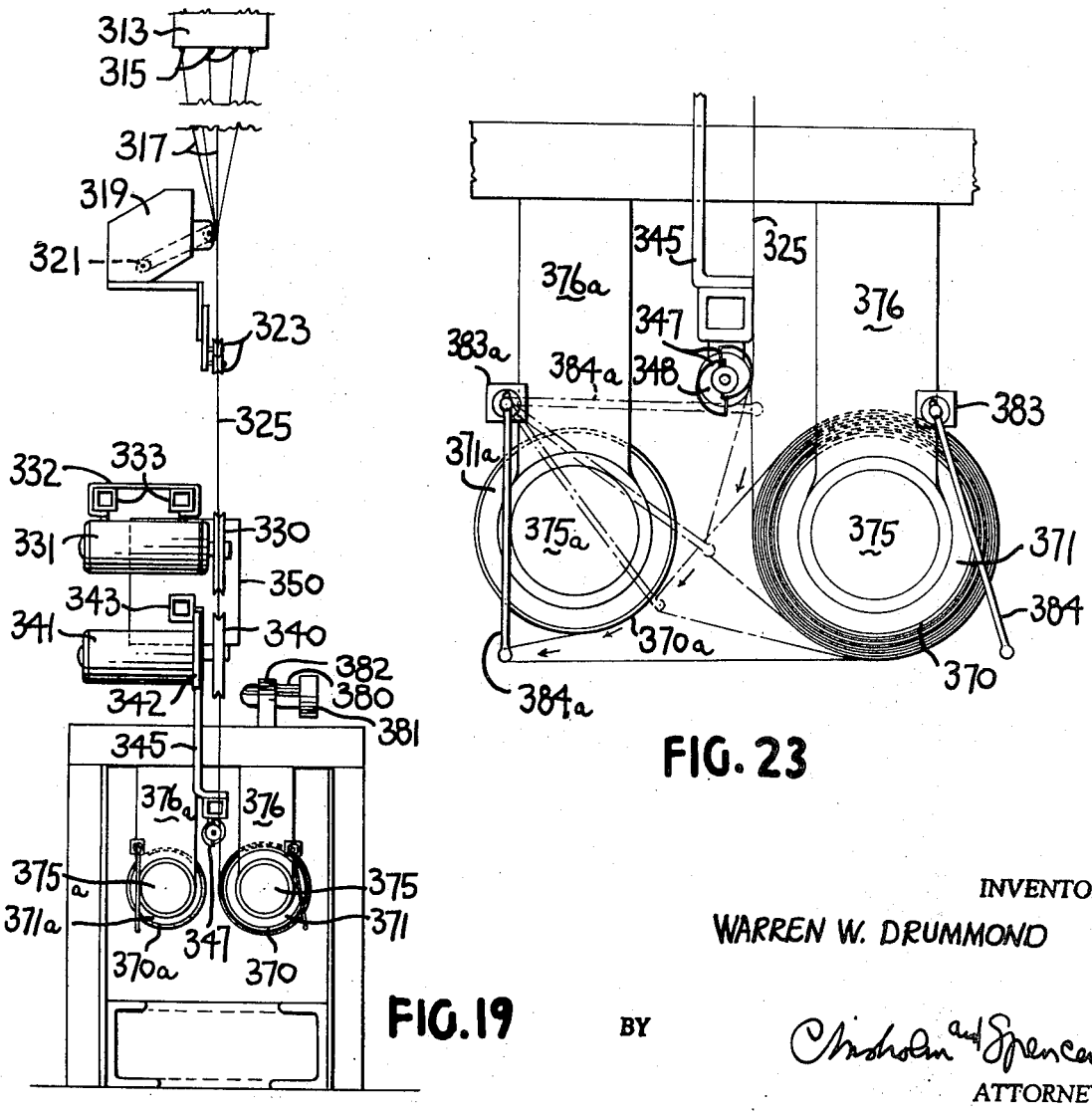

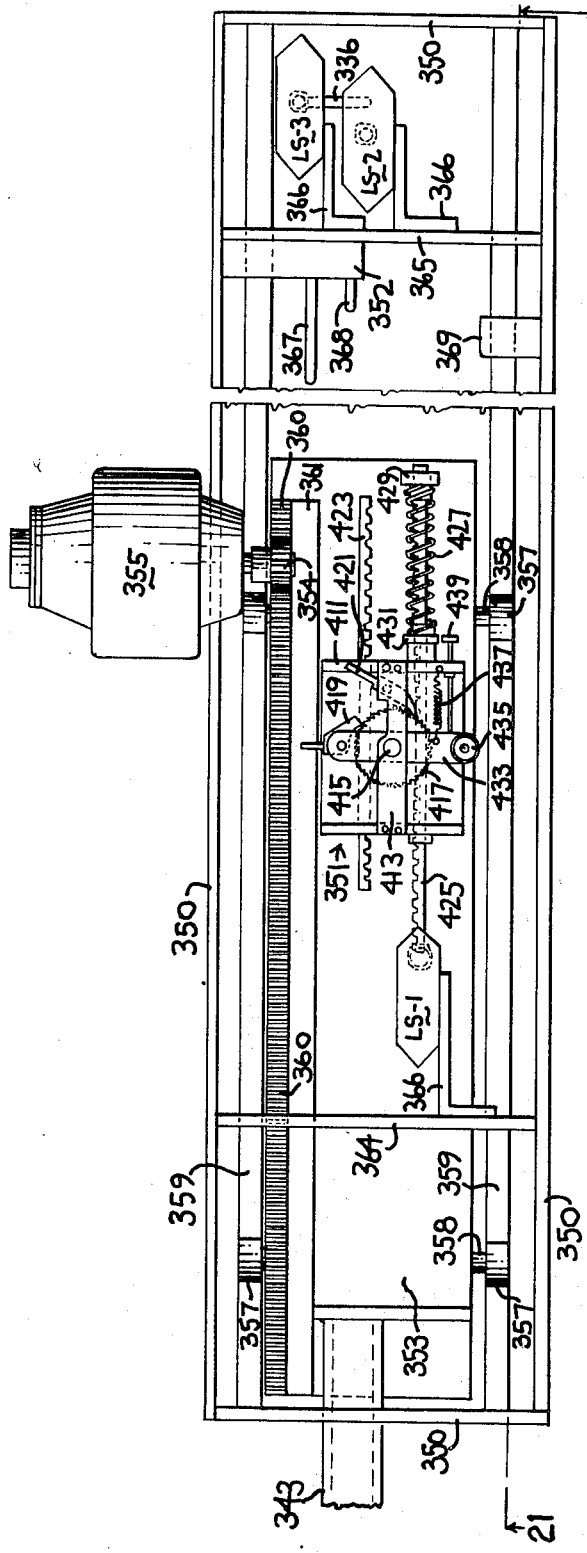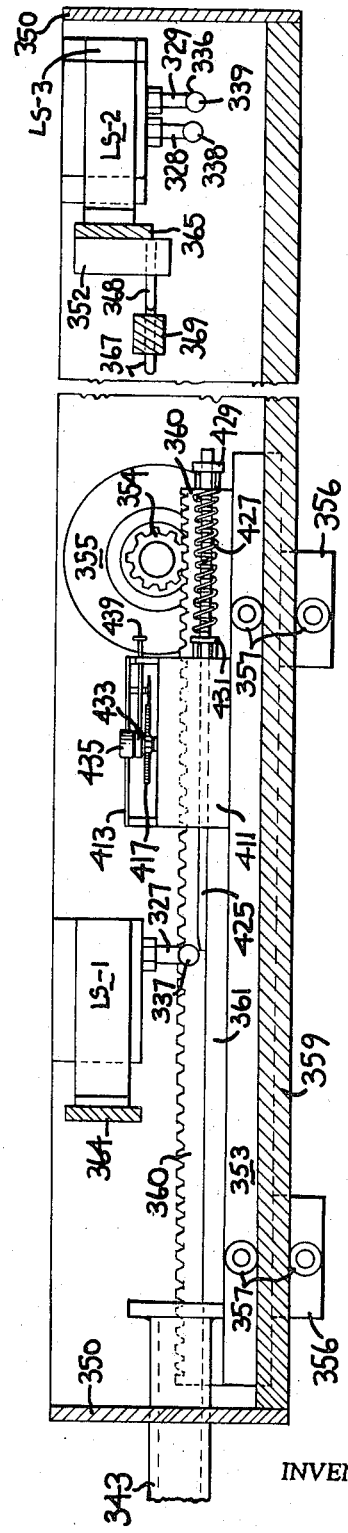

3,532,478
METHOD AND APPARATUS FOR FORMING AND WINDING GLASS STRAND
Warren W. Drummond, Allison Park, Pa., assignor to PPG Industries, Inc., Pittsburgh, Pa., a corporation of Pennsylvania
Continuation of application Ser. No. 602,433, Oct. 5, 1966. This application Sept. 29, 1969, Ser. No. 866,065
Int. Cl. C03b 37/00
U.S. Cl. 65—2          9 Claims

ABSTRACT OF THE DISCLOSURE

Strand winding method includes the steps of applying a winding and attenuating force which is composed of the primary winding force of one magnitude and a secondary force of another and lesser magnitude. The secondary force applies a forward thrust to strand before being collected in order to reduce tension in the strand. Apparatus is provided to implement the method.

---

This application is a continuation of my copending application Ser. No. 602,433, filed Oct. 5, 1966, which is a continuation in part of application Ser. No. 543,899, filed Apr. 20, 1966, both applications now abandoned.

This invention relates to forming and winding strand material, especially fiber glass strand.

In the usual process for producing glass fibers in strand form, streams of molten glass flow from orifices in a bushing and the streams are attenuated into small diameter fibers or filaments, which, after a binder is applied thereto, are gathered together as a strand. The strand is then wound iin superimposed layers on a tube or other rotating surface to produce a package, known as a forming package.

In the conventional method of producing a strand, the tube is positioned on a collet, one end of which is mounted to the driving means, the other end being "open" to permit loading of tubes, doffing of packages, and initiation of a strand forming and winding operation. The collet is driven at a constant angular velocity and the force applied to the strand by the rotating package is the primary attenuating force for the fibers. The tubes are generally small in diameter, i.e., 4 to 8 inches in diameter and thus it can be understood that as a package is wound, the diameter of the package increases and the linear drawing speed is increased. Unless compensated for, the increase in drawing speed will result in the production of filaments of constantly decreasing diameter. The drawing speed increase may be compensated for by increasing the temperature of the glass in the bushing, thereby varying the viscosity of the glass, which, in turn, increases the flow rate of the molten glass permitting filaments of substantially uniform diameters to be attenuated as the drawing speed increases. In the alternative, filaments of substantially uniform diameters may be produced by reducing the angular velocity of the package as the diameter of the package increases to maintain a substantially uniform strand winding speed.

Moreover, as the strand is wound into a package, the tension on the strand affects the quality of the package produced. While tension is desirable in order to maintain package integrity, the tensions resulting from the normal winding procedure are additive and increase as the package builds up to its desired size. Thus one layer constricts all layers previously wound and eventually causes them to crumple and kink. Crumpling and kinking of the inner layers cause permanent damage to the fibers and reduce the quantity and quality of usable yardage on the package because much of the damaged strand must be discarded. Because of this, fiber glass forming operations have been limited to producing forming packages containing five to eight pounds (dry weight) of fiber glass strand.

Although substantially uniform filament diameters may be obtained by compensating for package diameter increase through one of the previously described methods, in practice, either method generally results in a high tension on the strand. These high tensions, for example on the order of 200 to 400 grams, also make it necessary to use an expanding winding mandrel, on which collapsible tubes are wound, so as to be able to release the wound package tensions and remove the package from the mandrel.

Also, in the usual winding procedure, the drawing operation must be interrupted when a sufficient quantity of strand is wound on the package, the package must be doffed, a new tube placed on the mandrel and the winding process restarted. As will be readily understood, interruption of the winding process is costly in both time and glass. Thus from an economic standpoint it is desirable to continuously draw and wind strand, with as few interruptions as possible.

The present invention teaches the concepts, in the continuous strand process, of (1) drawing the strand at an attenuating speed which does not appreciably vary, (2) winding the strand at a controlled tension, generally of much less magnitude than heretofore obtainable in a direct wind system, for example, on the order of 50 to 150 grams, (3) providing substantial continuity of operation, (4) providing an improved strand package on the type of collecting surface utilized in the practice of one aspect of the present invention, (5) forming larger packages of strand material than was heretofore practical, and (6) starting a continuous strand forming and winding operation on a "closed end" collet or winding surface.

The concept of subjecting the strand to at least two separate forces, the sum of which provides the attenuating and winding force necessary to produce a satisfactory forming package, is basic to the above-named features. One of the forces, the primary force or drawing force, is provided by the surface upon which the strand is wound. The other force generally of a far lesser magnitude, the secondary force, is provided by engaging the strand before it is wound with a device which attempts to accelerate the linear speed of the strand. This latter device may consist of one or more capstans driven at a peripheral speed greater than the linear speed of the strand. In certain embodiments, the net effective force on the strand is controlled in coordination with the increase in diameter of the package being formed.

One method of controlling the net effective force is to control the speed of rotation of the winding surfaces, i.e., to reduce the angular velocity of the means supporting and driving the winding surface as the package diameter increases. Another method is to rotate the means supporting and driving the winding surface at a constant angular velocity as the package is formed while increasing the magnitude of the secondary force applied to the strand in accordance with the increase in strand speed resulting from forming package diameter increase, and simultaneously increasing the temperature of the molten glass to permit attenuation of filaments of substantially uniform diameter.

The first of the above-named features is attained by winding the strand on a collecting surface of such dimensions that the peripheral speed of the forming package, i.e., the primary force applied to the strand, does not appreciably vary as the superimposed layers of strand are wound thereon.

In one aspect of the present invention, the small diameter winding tube is replaced with a relatively large diameter reel on which the fiber is collected and from which it is removed. Such reel is on the order of 4 to 10 times the diameter of the conventional forming tube. Generally, it is desirable to drive the large diameter reel at a peripheral speed substantially equal to that of the small diameter conventional winding tube. However, as can be readily understood, an equal quantity of strand collected on the large diameter reel results in less package diameter increase and less strand speed variation. Strand speed variations on the order of four percent or less are obtainable. Thus, substantially constant attenuating and winding speeds may be obtained by driving a large diameter strand collecting surface at a constant speed. Strand speed variations on the order of four percent or less will be considered as substantially constant. Conventional weight packages, i.e., five to eight pounds, can be produced without compensating for package diameter increase. However, when larger packages are produced, the increase in package diameter again becomes significant and must be compensated for.

The tension of the strand being collected is controlled by the winding arrangement. A certain torque is required for winding and the winding torque is applied in the positive wind system by the winding tube. As mentioned above, the prior art teaches the modulation of the glass temperature or angular velocity of the collecting surface in coordination with package diameter increase to produce filaments of substantially uniform diameters. In the system of this invention as in the described prior art system, the winding torque or force is applied by the winder. This is where the similarity ends. In the present invention, an additional force, less than the winding force, is applied to the fibers before they are wound. Preferably, this is supplied by a capstan action to the strand with power being added by small motors driving the capstan or capstans, so that a forward thrust is applied to the strand. Since tension is related to forces resisting winding, i.e., flow rate of the molten glass and engagement of the strand with other components in the forming operation, the forward thrust applied to the strand tends to overcome this resistance and, the tension on the strand is materially reduced from that obtained by the regular direct winding approaches.

In one embodiment, the apparatus used to control tension includes the winding surface which is driven at a substantially constant attenuating speed and at least one, but preferably two, godet or capstan wheels which are individually driven at constant speed, the peripheral speeds of the godet or capstan wheels being greater than the strand speed when out of strand contact or without load being applied to their drive motors. Under load, i.e., when the strand is engaged, the strand acts as a brake and reduces the peripheral speed of the godet or capstan wheels. The peripheral speed of the wheels and the linear speed of the strand are then the same or nearly the same.

In other embodiments, those in which packages weighing more than eight pounds (dry weight) are formed, either the peripheral speed of the winding surface or the capstans is controlled in accordance with the increase in package diameter size to maintain a constant winding speed on the strand while the "no load" peripheral speed of the capstan is maintained in excess of the strand speed to reduce the tension on the strand as it is wound.

The third item set forth above is accomplished by specially-designed apparatus which includes at least a pair of strand winding surfaces so arranged that one of them is operative at all times.

The fourth item set out above is obtained by providing primary and secondary traversing motion to the strand as it is collected on the surface of a winding reel.

The relatively low strand tension obtained through the use of the secondary force discussed above permits winding of larger forming packages than was heretofore possible. The reduced tension on the strand wound in the outer layers of the forming package does not constrict the layers previously wound to as great an extent as conventional winding methods. Thus, forming packages containing thicker layers of strand may be wound without causing damage to the strand in the inner layers.

Particular arrangements of the capstan wheels also permit the winding of longer cylindrical packages of fiber glass strand. Forming packages measuring eight to twelve inches in length comprising fiber glass strand wound in superimposed layers to a depth of ⅜ inch to ½ inch are produced by conventional winding methods. In one aspect of the present invention, cylindrical packages greater than 18 inches in length may be formed by engaging the strand with a tension-controlling device and providing reciprocating means for delivering the strand along the length of the cylindrical winding surface.

In a preferred embodiment, the former is achieved by maintaining the linear strand speed constant as the package is formed and engaging the strand with the above-described capstan wheels to provide a forward thrust to the strand, thereby reducing the tension on the strand.

The means for delivering strand along the length of the cylindrical winding surface comprises a reciprocating traverse for traversing the strand onto the winding surface, along the length thereof, and means for reciprocating one of the capstans in coordination with the reciprocating traverse. This provides for delivery of the strand to the traverse in a path that forms a substantially constant angle to the axis of ration of the cylindrical winding surface. The angle of the path of delivery varies slightly due to the oscillating movement provided to the strand by the traverse—but generally is approximately 90°.

The above features of the invention also permit the strand to be wound or rigid tubes supported at both ends which have not been used commercially in fiber glass forming operations. Because of the reduced tension on the strand, the compressive force on the strand winding surface is reduced and the expanding mandrel and collapsible winding tube can be replaced with a lightweight rigid winding tube supported at both ends by hubs which provide the driving force for the tube. This eliminates the massive weight of collapsible collets thereby reducing the power requirements necessary to drive the forming package tube and simplifies the apparatus employed to support the tube.

However, being supported at both ends, the lightweight rigid tube constitutes a "closed end" collet or winding surface and requires a novel method of initiating the strand-forming and winding operation.

In the past, the operator gathered the strand and looped it around the open end of the rotating forming tube. With a "closed end" winding surface, the operation is initiated by manually drawing the strand across a portion of the strand collecting surface and then looping the strand around a second surface rotating at a peripheral speed greater than the peripheral speed of the strand collecting surface to start attenuating the fiber glass strand. The peripheral speed of the strand collecting surface is then accelerated to a speed greater than the peripheral speed of the second rotating surface to cause the strand to lick the strand collecting surface, begin winding thereon, and sever the strand between the two rotating surfaces. The strand collecting surface is then rotated at the speed necessary to attenuate and wind the desired package of fiber glass strand.

To more fully understand the inventive concepts herein set forth, attention is directed to the accompanying drawings in which;

FIGS. 1A and 1B (with 1B above 1A) illustrate a side view of apparatus constructed in accordance with this invention;

FIG. 8 is a schematic illustration of the relationship of the capstans and the winding reels;

FIG. 9 is a schematic circuit for operation of the apparatus illustrated in FIGS. 1 through 8;

FIG. 10 is a front view of apparatus similar to that shown in FIG. 2 utilizing an alternate arrangement of the strand tension controlling capstans.

FIG. 11 is an enlarged side view of the strand tension controlling capstan arrangement illustrated in FIG. 10;

FIG. 12 is a view taken on line 12—12 of FIG. 11;

FIGS. 13a through 13e are schematic illustrations of the relative positions of the tension-controlling capstans during operation of the apparatus illustrated in FIGS. 10 through 12;

FIG. 18 illustrates a side view of still another apparatus for continuously forming and winding fiber glass strand constructed in accordance with the teachings of the invention;

FIG. 19 is a front view of the apparatus illustrated in FIG. 18;

FIG. 20 is a plan view of a mechanism employed in conjunction with the operation of the apparatus illustrated in FIGS. 18 and 19;

FIG. 21 is an elevation of the mechanism shown in FIG. 20;

FIG. 22 is a schematic diagram illustrating a control system which may be employed to operate the apparatus illustrated in FIGS. 18 and 19; and FIG. 23 is an enlarged view of a portion of the apparatus shown in FIG. 19 illustrating the manner in which strand may be transferred from one cylindrical winding surface to another in the apparatus illustrated in FIGS. 18 and 19.

Figure 1B:
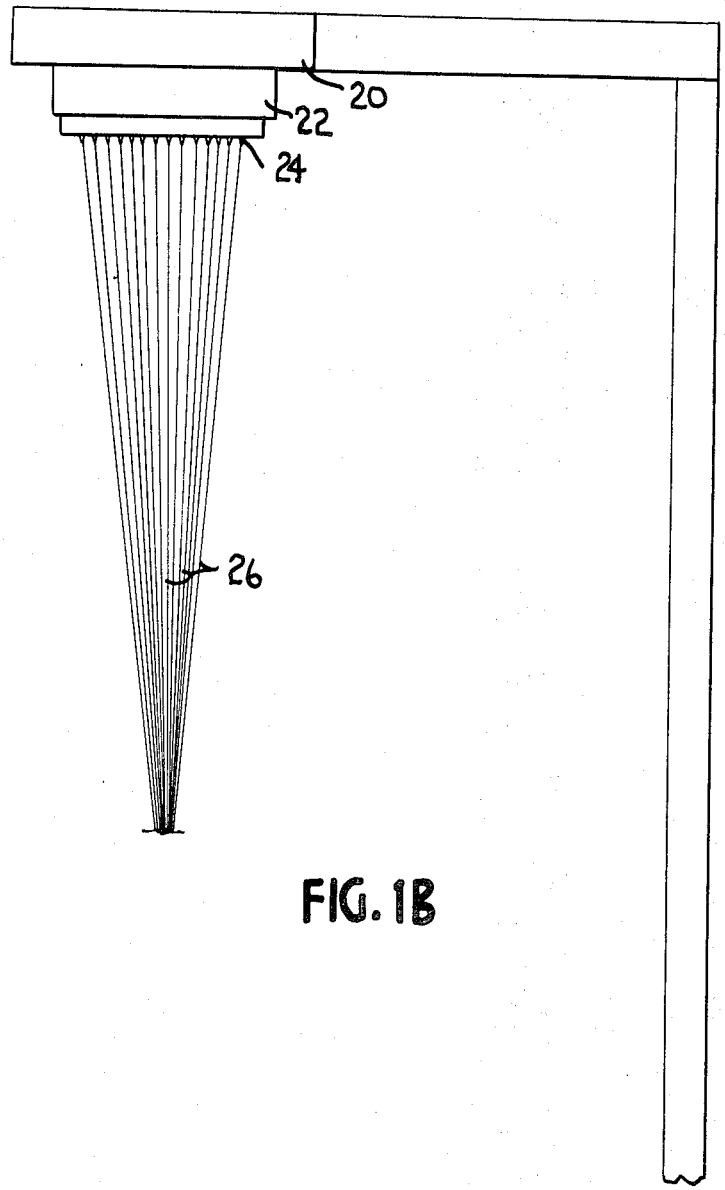

Turning now to the drawings, and especially FIGS. 1A and 1B, constituting, when FIG. 1B is laid above FIG. 1A, a side view of apparatus constructed in accordance with this invention, there is shown, schematically, a portion of a melting furnace forehearth 20 and a bushing 22 for receiving a quantity of molten glass from the furnace 20. The bushing 22 has tips 24, each of which includes an orifice through which molten glass flows as a stream, each stream to be formed and attenuated into filaments or fibers 26. The bushing 22 is conventional in construction, generally being constructed of platinum or platinum alloy, and may be electrically heated to control the viscosity of the glass therein and that glass flowing through the orifices. As such, the bushing construction and arrangement forms no part of the present invention.

The filaments 26 are grouped together into a strand 28 by gathering shoes 30, shown here as spaced members having filament receiving, smoothly contoured slots 32 therein. Generally, the gathering shoes are stationary and are constructed of a material which will not materially abrade the filaments, such as graphite. Of course, other types of gathering shoes may be used without departing from the spirit of the invention. Just prior to being gathered into a strand, a binder is applied to the filaments 26 by means of a binder applicator 34. As illustrated, the applicator may include a belt 36 which carries a film of binder on its surface. The belt of the applicator either passes through a pool of binder or has a binder fed directly thereto. Again, the binder applicator is conventional in construction and may be replaced with other known types of applicators without departing from the spirit of the invention. The binder may be any known organic binder generally having a resin constituent, so as to maintain the filaments in their desired strand configuration.

The primary attenuating and winding force is applied by the winding apparatus, generally identified by the reference character 40. This winding apparatus is so constructed and arranged for continuous operation, i.e., the strand is continuously formed and wound without interruption for removal and replacement of forming tubes, as is the case when conventional winding apparatus is used.

Figure 3:
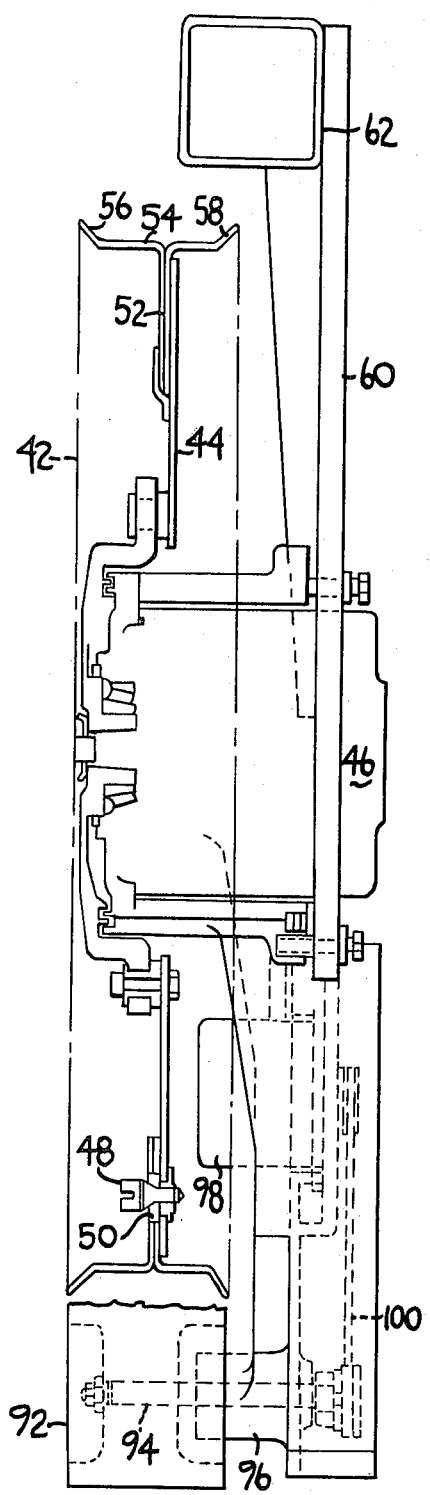
FIG. 3 is an enlarged sectional view taken on line 3—3 of FIG. 1A.

The winding apparatus constructed in accordance with this invention and illustrated, especially in FIG. 1A, includes a pair of relatively large diameter reels 42, 42a, each being receivable on a hub 44, 44a, which hubs are individually rotated by means of electric motors 46, 46a, respectively. The reels are adapted to be quickly connected to and disconnected from the hubs by known quick disconnect arrangements, such for example, headed lugs 48 on the hubs receivable in keyed-slots 50 in the connecting flange 52 of the reels 42, 42a. The reels 42, 42a (see also FIG. 3) are of lightweight construction, each having a web 54, the centrally disposed connecting flange 52, and spaced outwardly extending annular flanges 56 and 58. Fiber glass reinforced plastic is a suitable material for the reels. The web 54 and flanges 56 and 58 define in cross section a substantially U-shaped strand collection zone, as readily understood from the drawings. The reels may be constructed of multiple parts for disassembly to remove collected strand, if so desired or if required. Likewise the hubs 44, 44a may be of multiple part construction.

Each assembly of motor, hub and reel is supported on or from a bracket 60 connected to an elongated supporting arm 62 pivoted, as at 64, to a bracket 66 supported in a pit 68 below the bushing 22, such that each assembly 40 is pivotable between an operating position, noted at A, to a nonoperating position, noted at B. At the operating position A, the periphery of the reel 42 is positioned to receive strand. The assembly 40 is maintained in operating position by means of an air-cylinder operated latching arrangement, designated at 70 which includes air cylinder 72 having a movable rod 74 pivotably connected to a linkage 76 pivotable about a fixed axis 78. The linkage 76 has a latch portion 80 to engage a detent 82 fixed to the assembly 40. Manual controls may be provided to actuate the air cylinder 72, so as to latch the assembly in, or unlatch the assembly 40 from, its operating position. Automatic controls, such for example, operable by the quantity (as determined by time) of strand collected on a reel, may be provided for unlatching the assembly if so desired. Regardless of the nature of the controls, one skilled in the art can design such controls, depending upon the degree of automation desired.

In the embodiment shown, a handle 84 is provided by which an operator, standing on the floor 86 of the fiber forming room 88, may grip an assembly 40 and move it between positions A and B. Some power assist may be provided to assist the operator when moving the assembly 40 between the positions A and B, but such is not illustrated and forms no part of the invention. Movement between the positions A and B, may also, as will be understood, be fully automated, if so desired. The handle 84 is supported from and connected to a bracket 90 connected to the previously noted bracket 60.

The bracket 90 (see FIG. 3 also) also supports a traversing mechanism which includes a traverse 92 fixed to an axle 94 rotatably supported by a journal 96 forming part of the bracket 90. The bracket 90 supports an electric traverse motor 98 which, through a belt or pulley 100, drives the traverse shaft 94 and thus rotates the traverse 92.

Power to the motors 46 and 98 is supplied only when the assembly 40 is in the operating position A, as through contacts 102 and 104 and other suitable wiring.

Figure 5:
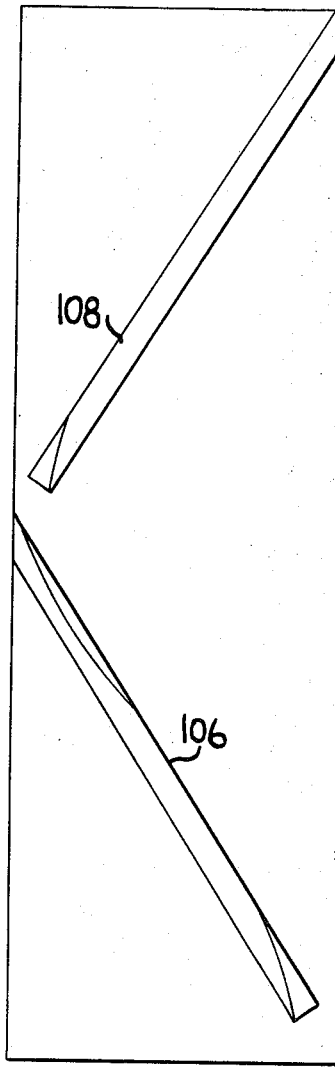
FIG. 5 is a development of the surface of the traversing means illustrated in FIG. 4.
Figure 4:
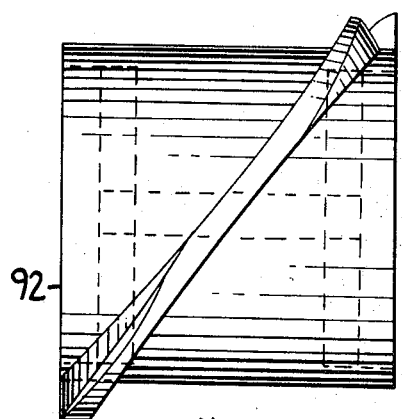
FIG. 4 is an enlarged view of a strand traversing means.

The traverse 92 of an assembly 40 (see especially FIGS. 4 and 5) is illustrated as being of the cam type, having cam surfaces 106, 108 along which the strand travels as it is being wound on a reel.

Between the winding apparatus 40 and the gathering shoes 30, there is located a godet or capstan wheel assembly 110 which includes first capstan wheel 112 and a second capstan wheel 114. Both capstan wheels are illustrated as being flanged and individually driven by electric motors 116, 118. Both capstan wheels are mounted for movement about an axis 120 which is closely adjacent to and preferably coincides with the center line of the strand.

Figure 7:
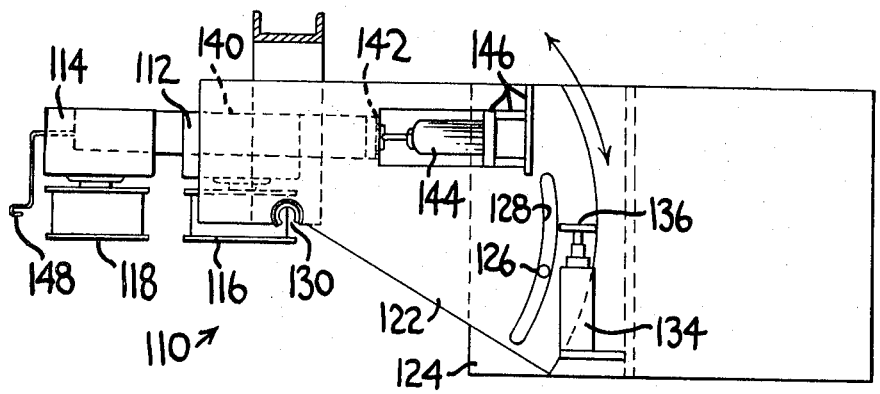
FIG. 7 is a view taken on line 7—7 of FIG. 6.

The capstan wheel 112 is positioned, as is illustrated, such that its periphery is always substantially in line with the center line of the strand, while the capstan wheel 114 is mounted for movement between an inoperative position, out of engagement with the strand, and shown in solid lines in FIGS. 1A and 7, and an operative position, shown in broken lines in those figures. In its operative position, as is further illustrated in FIG. 8, the capstan 114 is positioned in line with capstan 112 directly in front of the reel then being used for winding.

The assembly 110 is supported on a plate 122, movable laterally about the axis 120 on a support 124 being guided by an open sleeve pivot 126 connected to the support 127 passing through an arcuate opening 128 in the plate 122. The open sleeve pivot 126 permits passage of the strand 28. An air cylinder 134, supported by the frame of the apparatus, having its piston rod attached through a lug 136 to the plate 122, is used to move the plate 122 between its operating positions, these positions being determined by the particular reel being used for winding.

The capstan wheel 112 and its motor 116 are attached to the plate 122 by a bracket 138 and rotate with the plate about the pivot 126.

The capstan wheel 114 and its motor 118 are movable between the inoperative and the operative positions by being mounted on an arm 140 hinged to the plate 122 at 142. An air cylinder 144 fixed to the plate 122 by lugs 146 and to the arm 140 is used to move the wheel 114 between the operative and inoperative positions. A hooked wire guide or finger 148 attached to the arm 140 and disposed on the side of the capstan wheel 114 serves to guide the strand from one reel to the other when transferring the strand from one to the other. When the capstan 114 is moved to inoperative position, the guide 148 engages the strand and guides it to the transfer position. Because of the above-described construction, the capstan wheels are properly aligned with the respective operating reels as desired and are always aligned with one another.

FIG. 8 illustrates the reel and capstan positions during use. Note that the pivot point is aligned with the strand line and the periphery of the capstan wheel 112 is, regardless of its angular position, always aligned with the strand. Using the legends on the drawing, when the reel identified as Y is receiving strand, the capstan 112 is in position CX and the capstan 114 is in operating position GX.

When transfer of the strand is made from reel Y to reel X, the capstan 114 is retracted by piston 144 to position IY, the plate 122 is rotated and simultaneously the capstan 112 is moved to operating position CY. The capstan 114, because of the construction of the assembly 110, moves to position IX. Capstan 114 is then moved to position GY. Reel Y can then be doffed and an empty reel Y is attached for subsequent use.

When transfer of the strand from X to Y occurs, the capstan 114 is moved to position IX, the plate 122 is rotated, moving capstan 112 to position CX, and capstan 114 to position IY. Piston 144 then moves capstan 114 to position GX. Reel Y can then be doffed and an empty reel Y is attached for subsequent use. At positions CY and CX, the center line of the capstans is aligned with the center line of the respective reels.

Appropriate controls are also provided. The controls are preferably automatic, being started by manual push button and thereafter in time sequence. A single operator thus may operate a plurality of the winding assemblies, removing filled packages or reels as necessary.

FIG. 9 is a schematic illustration of a typical control arrangement, it being understood that the specific components of such a control arrangement can be selected from commercially available components and connected to perform as desired. As such, the specific control arrangement is not a part of the present invention but is included herein to describe an embodiment of the invention.

There is a starting manual switch S–1 connected to a timing mechanism T and to the capstan motors 116, 118. The timing mechanism is automatic and is connected to the reel motors 46 and 46a; the reel latches 80, and the air cylinders 134 and 144 for positioning the capstans 112 and 114.

The timer T may be arranged to be coordinated with the quantity of strand on a reel. After a desired quantity of strand is wound on one reel and with the other reel rotating at proper speed automatically in its operating position, the capstans 112 and 114 are properly positioned by the air cylinders 134 and 144 in proper sequence, as previously described to transfer the strand from one reel to the other and wind on the empty reel is initiated. The full reel is inactivated by its motor being de-energized and its assembly is unlatched, so that it can be moved to reel removing position where it is removed and an empty reel attached. The empty reel is moved to operating position and latched therein. Its motor is energized at proper time for strand transfer. The sequence is repeated automatically unless the strand breaks when manual restart is required. Of course, as described, doffing of the reel is manually accomplished.

Figure 2:
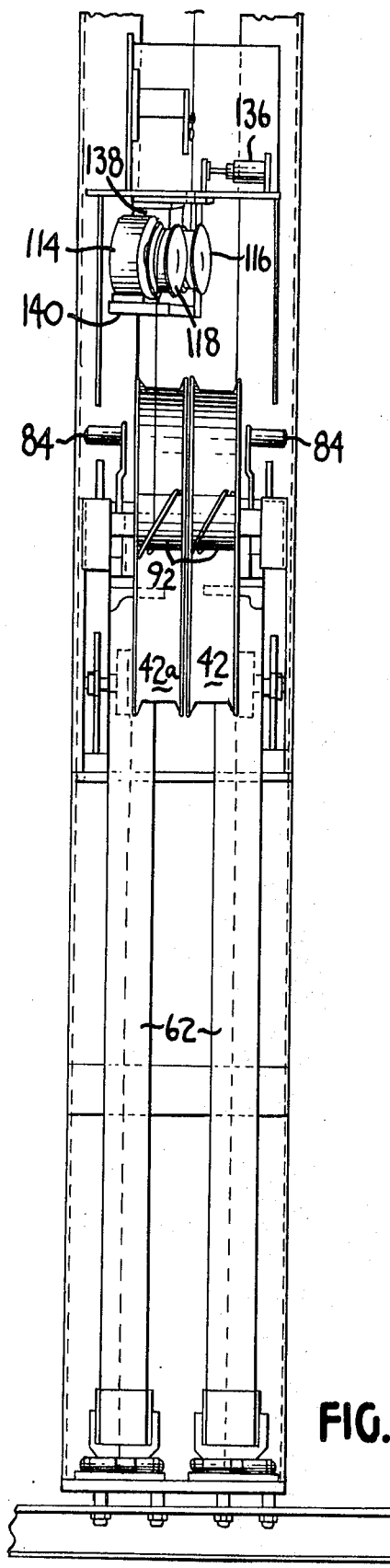
FIG. 2 is a front view of the portion of the apparatus illustrated in FIG. 1A.

FIG. 10 is a front view of apparatus similar to that shown in FIG. 2 utilizing an alternate arrangement of the strand tension controlling capstans and a reciprocating traversing mechanism. These features are shown more clearly in FIG. 11, an enlarged side view of the apparatus illustrated in FIG. 10, and FIG. 12, a view taken along line 12—12 of FIG. 11. For purposes of clarity and ease of description, in FIG. 11, the capstans 212 and 214 are shown with their axes of rotation centered on a vertical line rather than a diagonal line as illustrated in FIG. 10. In this embodiment it is preferred to operate with the capstans centered on a diagonal line since such arrangement more nearly centers the strand delivering capstan above the reel receiving the strand.

Referring now to FIGS. 10, 11, and 12, there are shown relatively large diameter reels 42 and 42a rotatably mounted on pivoting arms 62 in the same manner as described for FIGS. 1A and 2.

Positioned between the winding apparatus 40 and gathering shoes 30 is godet or capstan wheel assembly 210 which includes capstan wheels 212 and 214. Both capstan wheels are illustrated as being flanged and individually driven by electric motors 216 and 218.

Capstan motors 216 and 218 are affixed to capstan mounting plate 222. The shafts of motors 216 and 218 pass through holes provided in plate 222 and capstans 212 and 214 are affixed to the motor shafts in some suitable manner, such as a keyed shaft and collar arrangement, permitting the motor shafts to provide rotary motion to the capstans. The capstans are driven in different directions. As illustrated by the arrows shown in FIG. 10, capstan 214 is driven in a clockwise direction whereas capstan 212 is driven counter-clockwise.

Capstan mounting plate 222 is supported by U-shaped bracket 224 which, in turn, is welded to and supported by tube 226, which is rotatably supported by pillow blocks 228. Electric motor 230 mechanically connected to tube 226 by some suitable linkage, such as a gear 232 affixed to the shaft of motor 230, directly driving a gear 236 affixed to tube 226, provides rotary motion to tube 226 which, in turn, rotates bracket 224, plate 222, and the capstans 212 and 214 about an axis 220.

Electric motor 230 and pillow blocks 228 are mounted on inverted channel member 231, which is supported by plate 233 positioned on the ledges formed by horizontal legs of angles 234 and 235, which are affixed to and supported by the structural members of the apparatus.

A reciprocating traverse assembly 240 is also supported by angles 234 and 235.

Spiral wire traverses 242 and 242a, of the type shown in U.S. Pat. No. 2,391,870, are mounted on traverse supporting arms 246 and 246a, which are attached to traverse assembly mounting plates 248 and 248a, which, in turn, are hinged, as at 250 and 250a, to a reciprocating plate 244.

Traverse 242 is affixed to an axle 257 rotatably supported by bearing housing 259 affixed to the end of traverse supporting arm 246. Rotary motion is provided to the traverse 242 from electric motor 252 mounted on plate 248 by a chain 256 engaged with motor shaft sprocket 254 and sprocket 258 affixed to traverse axle 257.

Traverse 242a is supported and driven by components identical to those described for traverse 242.

Blocks 243, affixed to plate 244, provide support to and permit lateral movement of plate 244. Holes provided in blocks 243 permit the blocks to be positioned on rods 245 which are affixed to and supported by angles 234 and 235. The dimensions of the rods 245 and the holes provided in blocks 243 are such that allow the blocks to slide along the rods thereby permitting lateral movement of the plate 244.

Reciprocating lateral movement is provided to plate 244 by arm 270 which is supported by and pivoted about a pin 272 positioned in a hole provided in cross member 271.

Cam follower 274 affixed to one end of arm 270 travels in a continuous, sinusoidal groove 263 provided in cylindrical cam 262 mounted on shaft 264 journaled for rotary movement in blocks 265 affixed to angles 234 and 235. Rotary motion is provided to shaft 264 and cylindrical cam 262 by electric motor 269 which drives sprocket 268, chain 267 and sprocket 266 which is keyed on shaft 264.

The other end of arm 270 is provided with a slot 277. A pin 276 positioned through an appropriate hole in plate 244 is passed through slot 277.

Rotary motion provided to cylindrical cam 262 by motor 269 is translated into lateral movement of the arm 270 by cam follower 274. The arm 270 pivots about pin 272 providing lateral movement to pin 276 which travels in slot 277. The lateral movement provided to pin 276 drives plate 244 back and forth along rods 245. As plate 244 is driven back and forth, spiral wire traverses 242 and 242a are respectively reciprocated back and forth across the strand collecting surfaces of reels 42 and 42a.

Thus as the strand 28 is delivered to the collecting surface of one of the reels primary oscillating movement is provided to the strand by engaging the strand with the wire traverse rotating about its axis and secondary oscillating motion is provided to the strand by the reciprocating traverse assembly 240.

FIGS. 13a through 13e schematically illustrate the relative positions of the capstans 212 and 214 during operation of the apparatus shown in FIGS. 10 and 11.

When the operation is first started, as shown in FIG. 13a, capstans 212 and 214 rotating in the directions indicated by the solid arrows, are positioned with their axes centered on a horizontal line. The strand 28 passes between the capstans and is wrapped around the strand collecting surface of one of the winding reels such as 42a. As the strand begins to wind on reel 42a, capstans 212 and 214 by means of motor 230 and the mounting means providing rotary movement discussed above, are rotated clockwise through an arc of 120° to the positions shown in FIG. 13b. This movement engages the strand with the capstans, the latter providing forward thrust to the strand being wound on reel 42a as previously explained.

The position of the capstans illustrated in FIG. 13b is retained until a full package has been wound on reel 42a. When a full package has been wound, capstans 212 and 214 are rotated counterclockwise through an arc of 240°. This movement causes the capstans to pass through their original horizontal positions as illustrated in FIG. 13c to the positions desired for winding on reel 42 as illustrated in FIGS. 13d and 13e.

Movement of the capstans through their respective horizontal positions disengages the strand 28 from the capstans 212 and 214 as illustrated in FIG. 13c.

Although the strand 28 may still contact one of the capstans, for example capstan 214, the strand is not positively engaged with both capstans and may slip quite freely on the surface of the capstan in contacts. Such disengagement is necessary to prevent the strand from being severed when subjected to abrupt changes in speed as the strand is transferred across the large diameter flanges of the strand collecting surfaces of the reels.

Continued movement of the capstans 212 and 214 not only re-engages the strand 28 with the capstans, but before the strand 28 is completely re-engaged with the capstans, the arcuate movement of capstan 214 laterally displaces the strand 28 a sufficient distance to bring the strand into contact with the strand collecting surface of reel 42. The strand wraps around and begins winding on the strand collecting surface of rotating reel 42. At this point in time, reel 42 is rotating at full winding speed whereas reel 42a is being decelerated. The resulting difference in reel speed causes strand 28 to sever between reels 42 and 42a.

As illustrated in FIG. 13e winding is continued on reel 42, and reel 42 may be doffed and replaced with an empty reel. When a full package is wound on reel 42 the capstans are rotated clockwise through an arc of 240° to their respective positions as illustrated in FIG. 13b. This movement disengages the strand from the capstans 212 and 214 when they pass through their respective horizontal positions and the clockwise movement of capstan 212 laterally displaces the strand 28 causing it to contact and begin winding on the now empty strand collecting surface of reel 42a.

Figure 6:
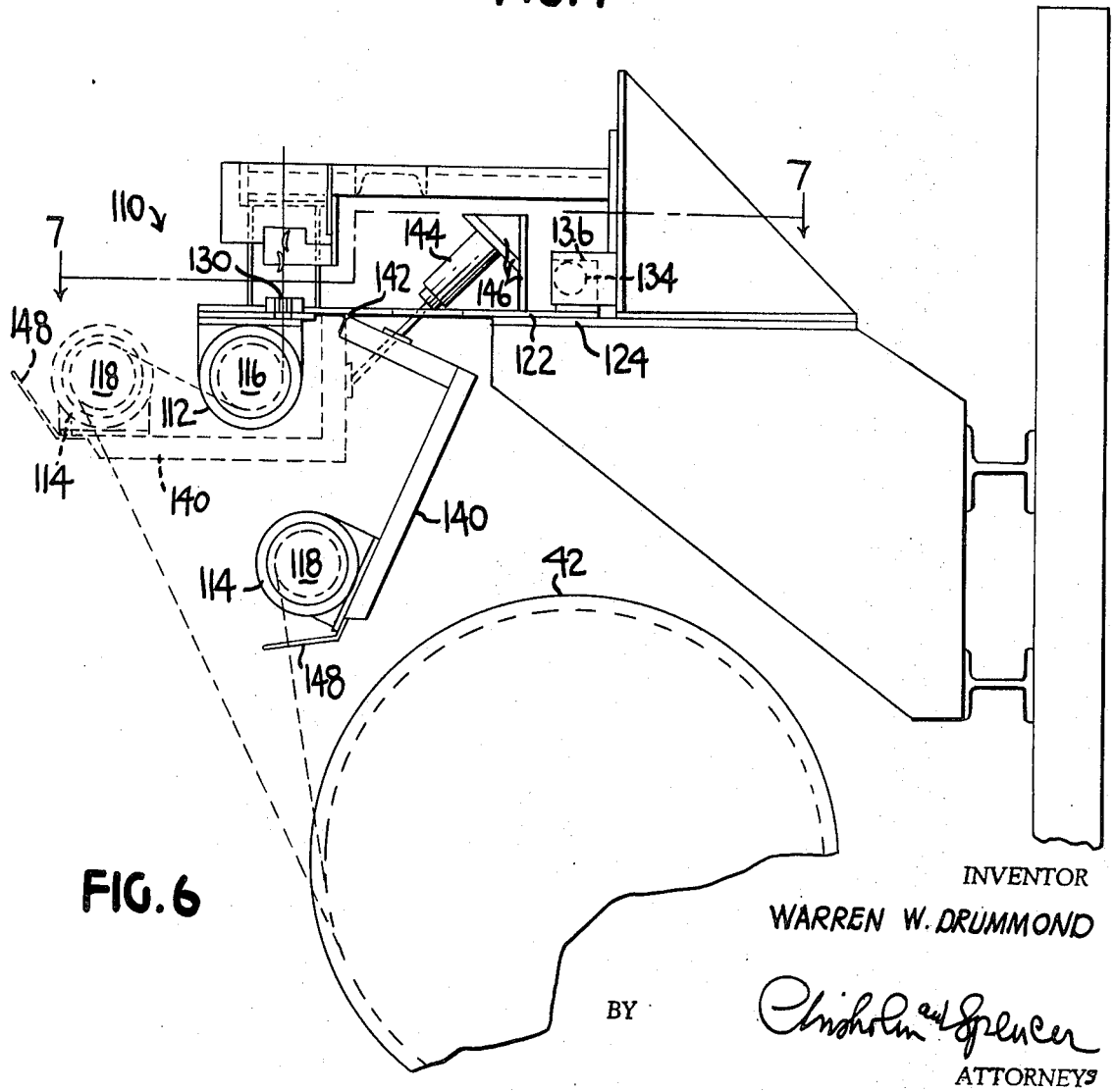
FIG. 6 is an enlarged side view of the capstan arrangement.

In some operations it may be desirable to also incorporate a strand guide, such as the hooked wire guide 148 illustrated in FIG. 6, to assist in the strand transfer operation, but with the apparatus illustrated in FIGS. 10 through 13, rotary movement of the capstans alone has proven effective.

Figure 14:
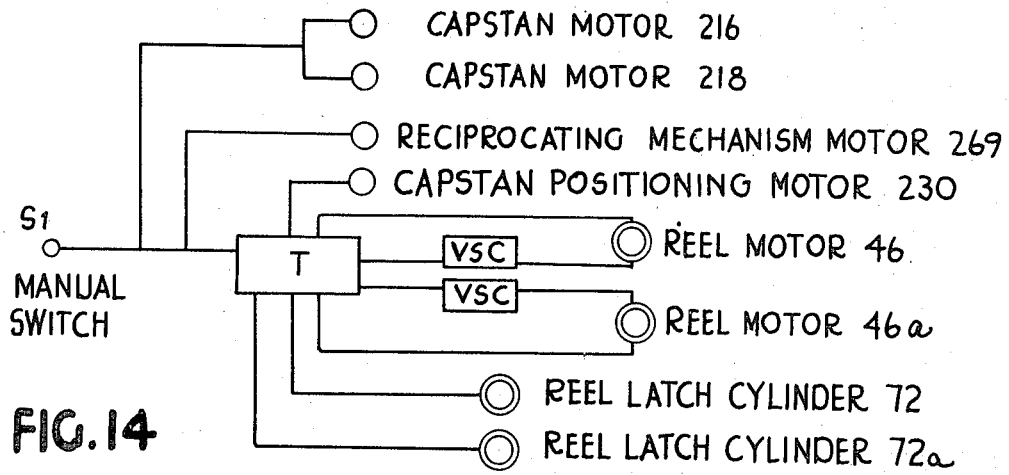
FIG. 14 is a schematic circuit for operation of the apparatus illustrated in FIGS. 10 through 12.

FIG. 14 is a schematic illustration of a typical control arrangement that can be used in conjunction with the winding apparatus illustrated in FIGS. 10 through 12.

There is a manual starting switch S–1 connected to a timing mechanism T and to the capstan motors 216 and 218. The timing mechanism is automatic and is connected to reel latch cylinders 72 and 72a, reciprocating mechanism, motor 269, capstan positioning, motor 230, and to reel motors 46 and 46a through variable speed controls VSC.

The timer T may be arranged to be coordinated with the quantity of strand to be wound on a reel. Variable speed control VSC may be a variable speed alternator such as that described in U.S. Pat. No. 3,090,570, or other suitable electronic control device, coordinated with the quantity of strand being wound on a reel to modulate the frequency of the current supplied to the motor 46 or 46a thereby reducing the angular velocity of the reel as the starnd package diameter increases.

After a desired quantity of strand is wound on one reel, the timer having previously energized the motor driving the other reel, de-energizes the motor driving the reel containing the full package and energizes capstan positioning motor 230 which rotates the capstan mounting plate 222 and capstans 212 and 214 in the manner described above to transfer the strand from the reel containing the full wound package and initiate winding on the empty reel. The timer T then activates the appropriate reel latch cylinder, so the reel may be moved to reel removing position where the package of strand is removed and an empty reel is attached. The empty reel is moved to operating position and attached therein. Its motor is energized at proper time for strand transfer. This sequence is automatically repeated by timer T until the strand breaks and then the sequence must be restarted manually.

Figure 15:
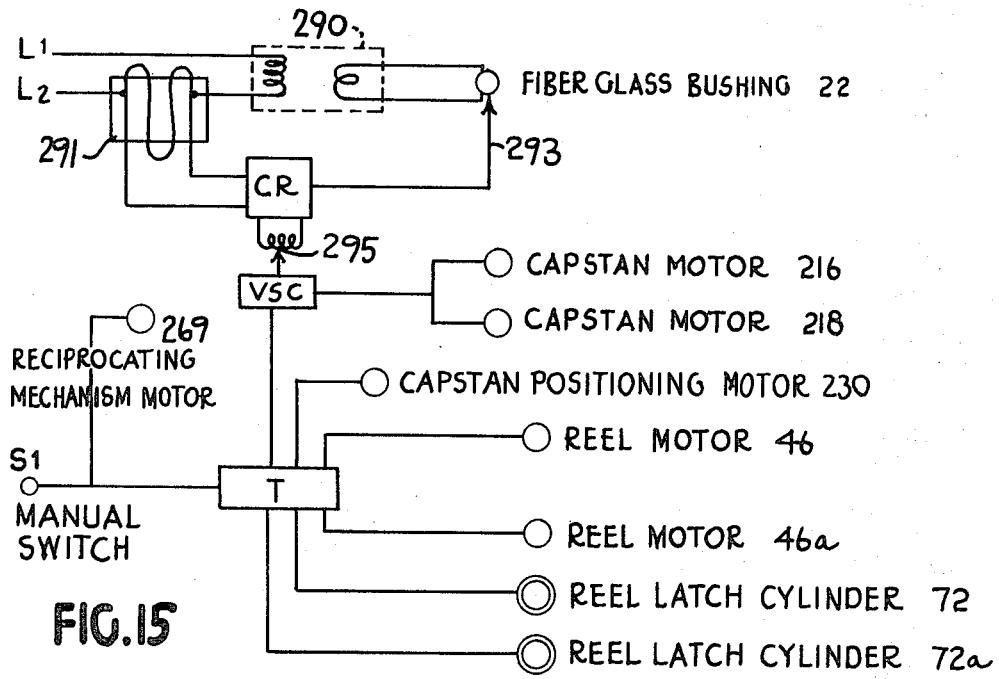
FIG. 15 is an alternate schematic circuit for operation of the apparatus illustrated in FIGS. 10 through 12.

FIG. 15 is a schematic illustration of an alternate control arrangement that may be used in conjunction with the winding apparatus illustrated in FIGS. 10 through 12.

There is a manual starting switch S–1 connected to reciprocating mechanism motor 269 and an automatic timing mechanism T. Timing mechanism T is connected to capstan rotating motor 230, real motors 46 and 46a, reel latch cylinders 72 and 72a, and through a variable speed control device VSC to capstan motors 216 and 218. There is also illustrated in FIG. 15 a transformer 290 supplying energy from a suitable line source, L1, L2, for example, a 440 volt, 60 cycle line, to bushing 22 containing the molten glass from which the filaments are drawn. The primary winding of the transformers 290 is connected in series with a saturable core reaction 291 which is controlled by a current regulating device CR. The current regulating device may consist of a conventional temperature measuring and regulating unit such as a thermocouple 293 placed in contact with bushing 22 and a variable resistance controlled by the capstan motor variable speed control VSC. Thus the current regulating device CR can by means of saturable core reactor 291 maintain the temperature of the bushing 22 at some desired temperature in accordance with the signal received from thermocouple 293. Moreover, the signal received from thermocouple 293 can be modified by that received from variable resistance 295 which is operated by capstan motor variable speed control VSC to increase the temperature of the molten glass in accordance with an increase in the peripheral speed of capstans 212 and 214. This control arrangement thus permits the winding of strand with constant speed motors 46 and 46a while compensating for strand package diameter increase by continually accelerating the peripheral speed of capstans 212 and 214 and increasing the temperature of the molten glass as the capstan speed is increased to permit attenuation of substantially uniform filament diameters.

Aside from the fact that the variable speed control VSC is utilized to modulate the speed of the capstans and the temperature of the molten glass, instead of modulating the peripheral speed of reel motors 46 and 46a as was the case for the schematic control illustrated in FIG. 14, the automatic operative features of timer mechanism T in FIG. 15 are substantially the same as those discussed for tubing mechanism T in FIG. 14.

Figure 16:
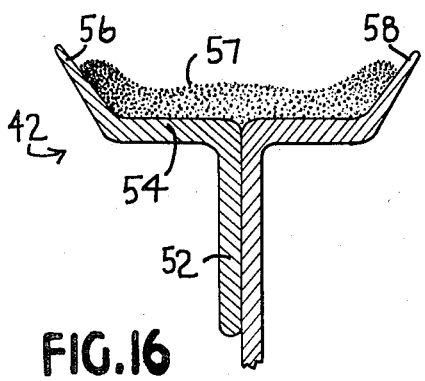
FIG. 16 illustrates one type of strand package that can be produced in accordance with this invention.

FIG. 16 presents a sectional view of a package of strand 57 wound on the strand collecting surface formed by flanges 56 and 58 and web 54 of a winding reel 42 with a non-reciprocating traverse assembly such as that illustrated in FIGS. 1A and 2. Note the irregular surface contour, especially the lobes formed adjacent spaced outwardly extending annular flanges 56 and 58. One would expect that a single oscillating motion applied to the strand by a non-reciprocating traverse would suffice to wind a relatively flat package of strand on a narrow, i.e., two to four inches wide, flanged strand collecting surface. However, this is not the case. The flanged surfaces 56 and 58 restrict the lateral movement of the strand causing the irregular surface contour shown in FIG. 16. Such a contour is highly undesirable in large weight packages. When forming large packages of strand, the changing elevation of the surface contour of the package produces changes in the drawing speed of the strand which subject the strand and filaments to changing attenuation forces as they are being drawn and wound. Strand wound on top of the lobes is drawn at a greater speed than strand wound on the central surface area of the package 57. This difference in drawing speed produces variations in the diameter of the filaments being drawn and in the tension on the strand.

Figure 17:
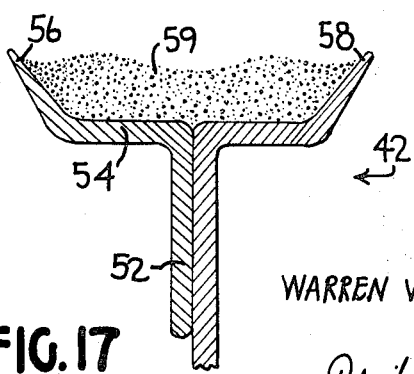
FIG. 17 illustrates an improved type of strand package that can be produced in accordance with the teaching of one aspect of the present invention.

The surface contour of a flanged forming package can be improved and the above difficulties alleviated by providing both primary and secondary oscillating movement to the strand as it is traversed onto the strand collecting surface of a flanged winding reel. FIG. 17 presents a sectional view of a package of strand 59 having a much improved, i.e., flatter surface contour. The surface contour illustrated for strand package 59 is typical of that obtained when winding strand with the apparatus illustrated in FIGS. 10, 11, and 12. The improved surface is obtained as the result of the combined effect of the primary oscillating movement provided to the strand by the rotating wire traverse 242 and the secondary oscillating movement provided to the strand by reciprocating traverse assembly 240.

Referring now to FIGS. 18 and 19, another apparatus constructed in accordance with this invention for continuously forming and winding fiber glass strand will be considered. There is shown a forehearth 311 containing a supply of molten glass which is delivered to bushing 313. Bushing 313 is provided with tips 315 through which the molten glass flows in streams which are attenuated into filaments 317. An aqueous size containing a liquid binder and a lubricant is applied to glass filaments 317 by size applicator 319. The aqueous solution is contained in a trough within size applicator 319 and applied to the filaments by means of a belt 321 as the filaments are drawn across the surface of the belt. Filaments 317 are then passed through gathering shoes 323 where they are gathered together to form a continuous strand 325.

The continuous strand 325 is then drawn across the surface of individually driven capstans 330 and 340 and traversed onto the cylindrical winding surface of a winding tube 370 by means of traverse 347. Winding tube 370 provides the primary winding and attenuating force to form filaments 317 and wind strand 325 into a cylindrical forming package. As in the apparatus described above, capstans 330 and 340 provide a secondary force which reduces the tension on the strand.

The winding operation is initiated by means of a start-up winding drum 381 driven by a motor 380 fixed by a bracket 382 to beam 377 which forms a part of the superstructure of the apparatus.

Winding tube 370 comprises a rigid tube measuring four to eight inches in diameter and of any desirable length. Although winding tube 370 may be formed from any of a number of materials, fiber glass filament wound reinforced plastic tubes have been satisfactory.

Winding tube 370 is supported by hubs 371 and 372. Hub 371 is an idler hub supported by shaft 375, which rotates within bearing housing 376 which is rigidly fixed to beam 377.

Hub 372 is driven by motor 373 positioned within motor housing 374, which is rigidly fixed to motor housing base plate 400. A pair of rods 401 supported by brackets 402 fixed to beam 377 is positioned through holes provided in motor housing base plate 400 to permit lateral movement on base plate 400 therealong.

Piston 379 of air cylinder 378 is connected to motor 373. Air cylinder 378 is fixed to vertical angles which form a part of the superstructure of the apparatus. Air cylinder 378 is a double-acting air cylinder which provides lateral movement to motor housing 374 and engages motor-driven hub 372 in the end of winding tube 370.

Capstans 330 and 340 are respectively driven by motors 331 and 341. Capstans 330 and 340 are independently driven and controlled. The manner in which they are controlled will be described below.

Capstan motor 331 is supported by a channel-shaped member 332 slidably positioned on tubes 333 (see particularly FIG. 19) for lateral movement. Tubes 333 are fixed to vertical angles which form a part of the superstructure of the apparatus. Piston rod 335 of double-acting air cylinder 334 is connected to capstan motor 331. During winding, piston rod 335 is extended to move capstan 330 to its leftmost position, as shown in solid lines in FIG. 18. When strand 325 is being transferred from one winding tube to the other, the pressure applied to air cylinder 334 is reversed to retract piston rod 335 and capstan 330 to the position indicated by broken lines in FIG. 18 thereby disengaging strand 325 from capstans 330 and 340.

Capstan motor 341 is mounted on plate 342 which is fixed to reciprocating tube 343. Traverse motor 348, driving traverse 347 is also fixed to reciprocating tube 343 by means of mounting plate 345 for coordinated reciprocating movement with capstan 340. Traverse 347 is a spiral wire traverse of the type shown in U.S. Pat. No. 2,391,870. Capstan 340 and traverse 347 are so positioned relative to one another that the strand 325 is drawn vertically down from capstan 340, is substantially centered on traverse 347, and is delivered to winding tube 370 in a path which remains substantially normal to the axis of the winding tube 370.

Reciprocating tube 343 is supported and driven by a reciprocating mechanism positioned within reciprocating mechanism housing 350.

Referring now to FIGS. 20 and 21, the mechanism providing reciprocal motion to reciprocating tube 343 and the manner in which the mechanism is activated and controlled will be described in greater detail.

Reciprocating tube 343 is welded to carriage plate 353 which is mounted for lateral movement within reciprocating mechanism housing 350 by means of cam followers 357 which serve as wheels riding on tracks 359 welded to the interior surfaces of the side walls of reciprocating mechanism housing 350. The shafts 358 of cam followers 357 are threaded into holes provided in the edges of carriage plate 353 and wheel blocks 356 welded to the bottom surface of carriage plate 353.

The force providing lateral movement to carriage plate 353 is provided by an instantaneous reversing electric motor 355. The pinion gear 354 keyed to the shaft of motor 355 is engaged with rack 360 fixed to rack support plate 361 which, in turn, is fixed to carriage plate 353. The motor 355 is supported by a suitable bracket fixed to the superstructure supporting reciprocating mechanism housing 350. Cross members 364 and 365 are also supported by the side walls of reciprocating mechanism housing 350 and by means of brackets 366 and pin block 352 provide support for limit switches LS–1, LS–2, and LS–3, and reset pins 367 and 368. The limit switches LS–1, LS–2, and LS–3 are positioned so their activating levers 327, 328, and 329, provided with roller-contacting members 337, 338, and 339, depend downward and are positioned in alignment with racks 423 and 425. Since both roller contacting member 338 and roller contacting member 339 are positioned to be activated by rack 423, activating lever 329 is provided with a horizontal extension 336 which permits roller contacting member 339 to be aligned with rack 423 directly behind roller contacting member 338.

Reset pins 367 and 368 are respectively positioned in alignment with pawl 419 and pawl 421. Also positioned along the interior side wall of the reciprocating mechanism housing 350 is a stationary cam 369 positioned in alignment with cam follower 435.

The direction and extent of movement of carriage plate 353 is controlled by a stroke shortening mechanism generally denoted by the numeral 351 supported by and partially contained within a rectangular housing 411 fixed to carriage plate 353. The stroke shortening means 351 is composed of racks 423 and 425 which engage roller contacting members 337, 338, and 339 of limit switches LS–1, LS–2, and LS–3. The effective length of racks 423 and 425 is controlled by a planetary gear arrangement contained within housing 411 which does not form a part of this invention and will not be described in detail.

The planetary gear arrangement is engaged with racks 423 and 425. The planetary gear arrangement is also connected to axle 415 which is mounted for rotation in bearings provided in housing 411 and bracket 413. Thus, axle 415 is rotated clockwise, the planetary gear arrangement extends the effective length of racks 423 and 425 moving the former to the right and the latter to the left. This extended length of the racks provides for successively shortened movements of carriage plate 353. Each movement or stroke is terminated by engagement of the ends of racks 423 and 425 with roller contact members 337, 338, and 339, of limit switches LS–1, LS–2, and LS–3.

Shortening the distance traveled during successive movements of carriage plate 353 produces a corresponding change in the lateral movement of capstan 340 and traverse 347. Progressively shortening the distance the strand is delivered along the length of the tube 370 provides for the formation of a level package of strand having tapered ends.

Axle 415 is rotated by means of a lever 433 and ratchet 417. Lever 433 is mounted for pivotable movement about axle 415 and is provided with a cam follower 435 and ratchet moving pawl 419 which is engaged with ratchet 417. As carriage plate 353 moves to the right as illustrated in FIG. 20, cam follower 435 contacts stationary cam 369, pivoting lever 433 about axle 415 and providing clockwise rotary movement to ratchet 417 by means of pawl 419 engaged therewith. Ratchet 417 being keyed to axle 415 provides rotary movement to the axle which, in turn, provides rotary movement to the planetary gearing arrangement within housing 411 which extends the effective length of racks 423, and 425. Lever 433 is held in a pre-determined position by means of bias spring 437 and set screw 439. A ratchet holding pawl 421 is mounted to pivot about a pin positioned through and supported by bracket 413. Pawl 421 holds ratchet 417 in position when cam follower 435 becomes disengaged with stationary cam 369 and pawl 419 slides back over the surface of ratchet 417 into position ready for the next ratcheting movement.

Rack 425 is provided with a spring 427 which is mounted on a spring guide 429 affixed to the end of rack 425 and a spring guide 431 which is attached to the housing 411. As the effective length of rack 425 is increased, that is, as rack 425 is extended to the left as illustrated in FIG. 20, rack spring 427 is compressed. The compressive force of rack spring 427 serves to reset the racks 423 and 425 at some predetermined point in the operation. For example, as illustrated in FIG. 20, by a suitable control arrangement when racks 423 and 425 are to be reset, limit switch LS–2 is disconnected permitting rack 423 to move a further distance to the right and engage roller contact 339 of limit switch LS–3. This additional movement brings the pins extending from pawls 419 and 421 into contact with reset pins 367 and 368. Reset pins 367 and 368 pivot pawls 419 and 421 out of engagement with ratchet 417 thus freeing the ratchet and planetary gear mechanism for movement by the force of compressed rack spring 427.

FIG. 23 illustrates an enlarged end view of the apparatus shown in FIG. 19 showing the manner in which strand may be transferred from a winding tube 370 containing a full package of strand to an empty tube 370a. Rotary air cylinders 383 and 383a may be utilized to transfer the strand.

Rotary air cylinders 383 and 383a are fixed to the supports for bearing housing 376 and 376a above and just off center of the axis of rotation of winding tubes 370 and 370a. A wire strand guide 384 and 384a bent to a 90° angle is positioned through a hole provided in the shaft of rotary air cylinders 383 and 383a and held in position by means of a set screw. Wire strand guides 384 and 384a are normally held in a vertical position, as illustrated by solid lines in FIG. 23, with the bent leg of the strand guides extending inward from the plane of the illustration. The wire strand guide 384a is held in this position as the strand 325 is being wound on tube 370. As stroke shortening mechanism 351 activates limit switch LS-3, rotary air cylinder 383a is cocked moving wire strand guide 384a counter clockwise through an arc of 90° to the horizontal position illustrated by broken lines in FIG. 23. As the last stroke of the traverse is completed, the strand moves behind the bent leg of wire strand guide 384a. At the completion of the last stroke, the timer T again activates rotary air cylinder 383a retracting wire strand guide 384a to its normal vertical position. As illustrated by broken lines in FIG. 23, wire strand guide 384a during its downward movement draws strand 325 into contact with the strand collecting surface of tube 370a. Tube motor 373a driving winding tube 370 having previously been energized, the strand 325 wraps the surface of tube 370a and begins winding thereon. Tension on the strand between tube 370 and 370a increases causing the strand to break. A full package may then be wound on tube 370a while the package on tube 370 is doffed and replaced with an empty tube.

When a full package is wound on tube 370a, rotary air cylinder 383 is activated to move wire strand guide 384 in position to receive the strand and draw it into contact with the surface of the now empty tube 370 thereby causing the strand to sever and begin winding a new forming package.

FIG. 22 is a schematic diagram of a typical control arrangement which can be used in conjunction with the apparatus illustrated in FIGS. 18 and 19.

Referring now to FIG. 22, there is illustrated a manual starting switch S–1 connected to an automatic timing mechanism T. The timing mechanism T may be constructed of commercially-available components and does not form a part of this invention. It merely serves to energize and de-energize, at properly-timed intervals, capstan motors 331 and 341, traverse motor 348, start-up motor 380, variable speed controls VSC to winding tube driving motors 373 and 373a, air cylinder 334, reciprocating motor 355, limit switch LS–2, and rotary air cylinders 383 and 383a.

The operator starts the continuous winding operation by depressing manual switch S–1. This energizes start-up motor 380, winding tube motor 373 and initiates the cycle controlled by timing mechanism T. After an interval of a few seconds, sufficient to initiate winding at the desired speed on tube 370, capstan motors 331 and 341 and traverse motor 348 are energized. At approximately the same time, air cylinder 334 is activated to extend piston rod 335 to the left thereby engaging the strand 325 with the capstans, and reciprocating motor 355 is energized to initiate the coordinated reciprocating movement of capstan 340 and traverse 347.

The timing mechanism T is preset in accordance with the quantity of strand to be wound on a tube. After the desired quantity of strand is wound on the tube 370, and with tube motor 373a previously energized and driving tube 370a at proper speed, the air pressure in air cylinder 334 is reversed to retract capstan 330 to the position illustrated by broken lines in FIG. 18. At the same time, rotary air cylinder 383a is activated moving wire strand guide 384a to the horizontal position ready to receive and transfer the strand.

Then, as capstan 340 completes its last forward movement with respect to the strand being wound on tube 370, the strand being free from the capstan action passes directly to the traverse 347 and is in position with respect to wire strand guide 384a to be transferred to winding tube 370a. At the completion of this last forward movement, timing mechanism T again activates rotary air cylinder 383a, causing strand wire guide 384a to rotate downward and transfer the strand 325 to winding tube 370a. The motor driving the tube 370 containing the full forming package is then de-energized by timing mechanism T. When the fully-wound tube stops rotating, the pressure on air cylinder 378 is reversed by means of a manual switch. Reversing the pressure retracts driving hub 372, thereby permitting the operator to remove the fully-wound forming package. An empty tube is then positioned on hubs 371 and 372, and the pressure in air cylinder 378 is again reversed to extend piston rod 379 thereby inserting hub 372 into the end of winding tube 370 to hold it in position ready to resume winding when a full package is formed on the eube 370a. At such time, motor 373 is energized and the strand is transferred in a manner similar to that described above. This sequence of operation is repeated until production is terminated or the strand breaks. In either instance, manual restart is then required.

The operation of the apparatus illustrated in FIGS. 1 through 8 by means of a control arrangement such as that illustrated in FIG. 9 will now be described. This substantially continuous process may be utilized to produce a plurality of controlled low-tension, conventional-size forming packages, that is, packages containing five to eight pounds of strand, on relatively large diameter reels driven by constant speed motors. As mentioned previously, replacing the conventional four to eight inch diameter winding tube with a relatively large diameter strand collecting surface rotated at a constant angular velocity provides a strand attenuating and winding speed that does not appreciably vary as the package is wound. It should also be noted that the irregular surface contour depicted in FIG. 16 is not as significant with small five or six pound packages of strand. Therefore, the use of a reciprocating traverse assembly is optional when producing conventional size packages in the following manner.

To begin operation, a group of filaments is drawn over the binder applicator 34, through the gathering shoes 30 and between the capstans 112 and 114 as illustrated, the capstan 114 being in its inoperative position, and then to a reel 42 or 42a. At least one and generally both reels are started, i.e., rotated at proper speed, by actuation of their motor, and the strand is wrapped around the desired reel so as to begin winding. The capstan 114 is then moved to operating position. After the reel has the required quantity of strand thereon, the capstan 114 is moved out of engagement with the strand to facilitate transfer of the strand to the other reel. Lateral movement of the capstan 114 in its inoperative (nonwind) position together with the hooked wire guide 148 engaging the strand transfers the strand, after which the capstan 114 is moved to its operative position which is aligned with the reel now receiving the strand. The filled reel, after its motor is inactivated, is unlatched and shifted forward. The filled reel is removed and replaced with an empty reel, which is returned to an operating position. At the proper time, with the empty reel rotating at the same speed as the filled reel, transfer of the fiber is accomplished as described previously. The sequence is repeated. If by chance the strand breaks, the operator begins the sequence anew.

The capstans are driven at a uniform peripheral speed in excess of the linear speed of the strand. Generally, the excess speed is on the order of two to ten percent. The strand engages the capstans and causes them ot run at winding speed. The resultant force applied to the strand is added as forward thrust. The forward thrust is such to reduce the winding torque generally required for winding the strand on the reels, which are driven at substantially uniform speed. Thus, the tension on the wound strand is less than that on the strand in the absence of the driven capstans. For example, the tension usually produced in a strand being conventionally wound is on the order of 200 to 400 grams, while the tension in a strand wound when using the teachings of this invention is usually on the order of 50 to 150 grams.

Moreover, because the reels are relatively large in diameter, as for example, 28 to 30 inches, and with rims about 4 inches wide and 1 inch deep, there is much less peripheral speed change when compared with normal winding tubes having diameters on the order of five inches. Thus, a substantially constant attenuating and winding speed is obtained by rotating the large diameter reel at a constant speed. For example, an eight pound forming package of fiber glass strand comprising 400 filaments, each about .0028 inch in diameter, can be produced on a reel having a strand collecting surface measuring 28 inches in diameter by 4 inches wide by rotating the reel at a constant speed of 1,850 revolutions per minute. This provides an initial strand speed of approximately 13,500 feet per minute. The strand is wound to a depth of ¼ inch. The package diameter increase, i.e., 28 inches to 28½ inches, results in a 2.3 percent increase in the linear speed of the strand.

The capstans are four to six inches in diameter rotating at 8,900 to 13,150 r.p.m. depending on their diameter. Usually, they are driven at a speed of two to ten percent above that of the winding reels. At no load speed they have a peripheral linear speed of approximately 13,770 to 14,850 ft./min. and a load speed of approximately 13,500 ft./min.

The operation of the apparatus illustrated in FIGS. 10 through 13 by means of a control arrangement such as that illustrated in FIG. 14 will now be described. The apparatus, by incorporating a variable speed control VSC on the motors driving the strand collecting reels and a reciprocating traverse assembly 240, is utilized when strand packages larger than the conventional five to eight pound packages are to be wound.

With large packages of strand the increase in package diameter again becomes significant and the speed of the motor driving the strand collecting reel is gradually decreased as the package is formed to maintain a substantially uniform winding speed on the strand. With large packages it is also necessary to provide primary and secondary oscillating movement to the strand as the package is being formed to maintain a substantially level surface contour on the package, such as that illustrated in FIG. 17.

To start the continuous process the operator depresses manual switch S-1. This switch energizes capstan motors 214 and 218, reciprocating mechanism motor 269, and timing mechanism T. The capstans, again, may be 4 to 6 inches in diameter and are rotated at 8,900 to 13,150 r.p.m., depending on their diameter. They are usually driven at a constant peripheral linear speed of approximately 13,700 to 14,850 ft./min. When engaged with the strand, the strand reduces the peripheral linear speed of the capstans to approximately 13,500 ft./min.

Reciprocating mechanism motor 269 drives reciprocating traverse assembly 240 back and forth over a lateral distance of approximately 1½ inches at a rate of 40 to 80 cycles per minute when a traverse 3 inches in length is utilized to traverse strand on a collecting surface 4 inches wide. With a traverse 2 inches in length, the lateral distance is increased to 2½ inches for a strand collecting surface 4 inches wide.

Timing mechanism T energizes motor 46a driving reel 42a at approximately 1,850 r.p.m. This provides a peripheral speed of approximately 13,500 ft./min. for a reel having a 28-inch diameter strand collecting surface. To start the winding operation, a group of filaments 26 is drawn over the surface of binder applicator belt 36, through the gathering shoes 30, between the capstans 212 and 214 and then to a reel, for example, 42a. Generally, there are 200 to 400 filaments, about 0.0003 inch in diameter being drawn at one time. When the operation is started, the capstans 212 and 214 are horizontally positioned with respect to each other as shown in FIG. 13a. The strand is wrapped around the strand collecting surface of reel 42a to begin winding. Timing mechanism T then energizes capstan positioning motor 230 which rotates capstans 212 and 214 in a clockwise direction, engaging the strand as shown in FIG. 13b. Engaging the strand with the capstans reduces their peripheral speed causing them to run at winding speed. The force applied to the strand reduces the tension on the strand being wound. The strand is then wound on reel 42a.

As the desired quantity of strand is being wound, reel motor 46a variable speed control VSC reduces the speed of reel motor 46a to approximately 1,760 r.p.m. as the package of strand is being wound. With a 28-inch diameter strand collecting surface, this speed reduction over a period of approximately 50 minutes has been found satisfactory to produce a 16-pound dry weight package of strand while attenuating and winding the strand at a substantially constant linear speed of 13,500 ft./min.

After the reel has the desired quantity of strand thereon, the capstans 212 and 214 are rotated counter clockwise, disengaging the strand and transferring the strand to the other reel 42 in the manner described above. Reel 42 is rotating at a speed of 1,850 r.p.m. when the strand is transferred. The speed of reel 42 is reduced to 1,760 r.p.m. over a period of 50 min. to form another 16-pound package of strand.

The filled reel 42a, after its motor is inactivated, is unlatched and shifted forward. The filled reel is removed and replaced with an empty reel and then returned to an operating position. At the proper time, timing mechanism T again energizes reel motor 46a, causing reel 42a to rotate at a speed of approximately 1,850 r.p.m. Then with reel 42 rotating at a speed of approximately 1,760 r.p.m. timing mechanism T again energizes capstan positioning motor 230, causing capstans 212 and 214 to rotate counter clockwise to the positions illustrated in FIG. 13b, thereby disengaging the strand and transferring the strand to the collecting surface of reel 42a where winding is resumed. This sequence is repeated. If by chance the strand breaks, the operator begins the sequence anew.

The operation of the apparatus illustrated in FIGS. 10 through 13 by means of a control arrangement such as that illustrated in FIG. 15 will now be briefly considered. As with the preceding discussion, the control arrangement of FIG. 15 is also satisfactory for winding large packages of strand.

In FIG. 15 the control components are substantially the same as those in FIG. 14 with the exception that constant speed reel motors 46 and 46a are utilized to drive the strand collecting reels 42 and 42a.

The increase in the linear speed of the strand resulting from the increasing package diameter is accommodated by increasing the temperature of the molten glass in bushing 22 to increase the flow rate of the molten glass, thereby providing for the production of filaments of substantially uniform diameters. The tension on the strand is reduced by engaging the strand with capstans 212 and 214 before it is wound on a reel. However, since the linear speed of the strand increases as the package is formed, the peripheral speed of the capstans is increased accordingly. The peripheral speed of the capstans 212 and 214 is increased by varying the frequency of the current supplied to capstan motors 216 and 218 by a variable speed control VSC, for example, a high-frequency alternator or other electronic control device.

The molten glass temperature increase is controlled by means of a current regulating device CR controlling saturable core reactor 291 connected in series with the primary winding of transformer 290 and energy source line $L_1$ and $L_2$. The current regulating device CR receives a signal from thermocouple 293 placed in contact with bushing 22 which is modified by a signal received from a variable resistance 295 which is, in turn, controlled by the variable speed control VSC in accordance with the increase in capstan speed, the net effect of which is to gradually increase the temperature of fiber glass bushing 22 as the peripheral speed of capstans 212 and 214 is increased.

To form a 16-pound dry weight package of strand on a collecting surface measuring 28 inches in diameter by 4 inches wide, the timing mechanism T is designed to control the components in the following manner:

The reel motor 46 or 46a rotates the strand collecting reel 42 or 42a at a constant speed of 1,850 r.p.m. Strand will be wound to a depth of approximately ¾ inch to form a 16-pound package. Forming such a package will produce an approximate linear strand speed increase from 13,500 f.p.m. to 14,300 f.p.m.

Capstan motors 216 and 218 are energized at the appropriate time by timing mechanism T and controlled by variable speed control VSC to rotate capstans 212 and 214 at a peripheral linear speed approximately four per cent greater than the linear speed of the strand. Accordingly, 4-inch diameter capstans 212 and 214 are initially driven at a speed of approximately 13,400 r.p.m. which is increased to 14,200 r.p.m. during the 50-min. period required to form the package.

The temperature of bushing 22, normally maintained within the range of 2240° F. to 2260° F., is increased 4°, approximately 1° F. every 12½ min. as the package is being formed.

Aside from the fact that the variable speed control VSC is utilized to modulate the speed of the capstan and the temperature of the molten glass instead of varying the angular velocity of reels 42 and 42a, the control arrangement illustrated in FIG. 15 is utilized to continuously operate the apparatus in much the same manner as the control arrangement illustrated in FIG. 14.

The operation of the apparatus illustrated in FIGS. 18 and 19 by means of a control arrangement such as that illustrated in FIG. 22 will now be considered. As with the preceding discussions this apparatus and control arrangement provides a substantially continuous process which may be utilized to produce a plurality of controlled low-tension forming packages.

Low-tension conventional size forming packages may be continuously produced on the apparatus illustrated. For purposes of discussion, the operation will be described in conjunction with the production of a 16-pound package of strand on a rigid fiber glass filament wound reinforced plastic tube measuring 12 inches in diameter by 14 inches long. Larger packages may be formed by extending the length of the tube or by winding the strand to a greater depth. These alternatives are commercially feasible because of the reduced tension on the strand and the reciprocating capstan and traverse arrangement that delivers the strand along the length of the tube.

To begin operation, a group of filaments is manually drawn over the size applicator 319 through the gathering shoes 323, between the capstans 330 and 340, with capstan 330 retracted to its inoperative position, over the surface of rotating traverse 347, down beneath the cylindrical winding tube 370, and up over the surface of start-up winding drum 381. Start-up motor 380 and winding tube motor 373 are simultaneously energized by depressing manual switch S-1. Capstan motors 331 and 341 and traverse motor 348 are energized after a timed interval when the strand is being wound at full speed on tube 370. Start-up motor 380 driving winding drum 381 has a minimal amount of inertia to overcome and winding drum 381 attains surface velocity of 6,000 to 8,000 f.p.m. more rapidly than does winding tube 370. Thus, strand is initially wound on winding drum 381. When the surface velocity of winding tube 370 exceeds that of drum 381, approximately three seconds after start-up the strand licks winding tube 370, and after making a complete revolution around tube 370, the strand breaks between tube 370 and drum 381 and begins winding on tube 370. Start-up motor 380 is then automatically de-energized by timer T until such time that the operation has to be restarted.

Meanwhile, pressure is applied to air cylinder 334, which moves capstan 330 into operating position, and motor 355 is energized providing reciprocating motion to traverse 347 and capstan 330. Reciprocating tube 343 moves at a speed of 220 to 260 inches per minute.

When first energized, motor 373 drives winding tube 370 at a speed of approximately 4,300 r.p.m. As the strand is wound to a depth of ⅝ inch to form the desired package, variable speed control VSC reduces the speed of winding tube 370 to approximately 4,100 r.p.m. This provides for a constant linear strand speed of 13,500 f.p.m. as the package is formed.

Capstans 330 and 340 being 4 inches in diameter are driven at a constant speed of 13,400 r.p.m. This produces a peripheral speed approximately four percent in excess of the linear speed of strand 325. Engagement of the strand with the capstans causes the capstans to rotate at a reduced speed. The excess force is applied to the strand and reduces the tension on the strand being wound.

As the desired quantity of strand is wound on tube 370, the timer activates winding tube motor 373a, disconnects limit switch LS-2 positioned within reciprocating housing mechanism 350, and reverses the pressure applied to air cylinder 334. These events occur as the reciprocating tube 334 starts its last forward stroke, i.e., moves from right to left as illustrated in FIGS. 18 and 20, with respect to the strand being wound on winding tube 370. These events respectively place tube 370a in operation to receive, attenuate, and wind strand 325; permit recpirocating mechanism 351 to by-pass the reversing movement which would otherwise occur by contacting limit switch LS-2; reset pawls 419 and 421 controlling the movement of ratchet 417 to provide for a new package build-up; permit rack 423 to contact limit switch LS-3, thereby reversing motor 355; activate rotary air cylinder 383a, moving wire strand guide 384a to its horizontal position; and retract capstan 330 to its inoperative position.

Then, as reciprocating tube 334 completes its last forward stroke, i.e., reaches its leftmost position as illustrated in FIG. 18, the timer T activates rotary air cylinder 383a which moves wire strand guide 384a downward, thereby causing strand 325 to lick the surface of winding tube 370a. Strand 325 is then severed, due to the tension which builds up from applying force to the strand in opposing directions, and begins winding on tube 370a.

Tube motor 373 is then de-energized by timer T. After the tube stops rotating, the operator reverses the pressure on air cylinder 378 by means of a manual switch. This retracts driving hub 372 and permits the operator to remove the fully-wound forming package and install an empty winding tube. At the proper time, motor 373 is again energized and the strand 325 is transferred to winding tube 370 by means of rotary air cylinder 383 and wire strand guide 384 in a manner similar to that described above. This sequence is repeated until production is terminated or until the strand breaks. In either event, the sequence of operation is started anew.

In the foregoing, certain forms of the present invention have been described and illustrated in detail. These have been set forth as preferred embodiments only and are not to be construed as limitations on the concepts of the invention. Various changes may be made in the shape, size, and operation of the components set forth in the

What is claimed is:

1. A method of continuously winding a plurality of packages of strand material which comprises:
   drawing said strand from a source,
   applying an attenuating force to said strand by winding said strand on a rotating surface to form a package thereon,
   engaging said strand before it is wound with a device which imparts a forward thrust to said strand thereby reducing the tension on the strand,
   disengaging said strand from said tension-reducing device,
   transferring said strand to a second rotating surface,
   re-engaging said strand and said tension-reducing device, and
   winding said strand material to form another package on said second rotating surface.

2. The method of claim 1 wherein said strand is engaged with a spaced pair of capstans, said capstans being independently driven at peripheral speeds in excess of the linear speed of said strand to provide a forward thrust to said strand thereby reducing the tension on the strand.

3. A method of winding strand material in parallel superimposed layers on a rotating cylindrical surface which comprises:
   drawing said strand from a source,
   engaging said strand with a tension-reducing device,
   delivering said strand to a traverse in a path which forms a given angle with the axis of rotation of said cylindrical surface,
   reciprocating said traverse in a path parallel to the axis of rotation of said cylindrical surface while maintaining said angle of the path of delivery of said strand to said traverse substantially constant,
   traversing said strand onto said cylindrical surface, and
   applying an attenuating force to said strand by winding said strand to form a package on said cylindrical surface.

4. The method of claim 3 wherein said strand is engaged with at least one rotating member driven at a no-load peripheral speed in excess of the linear strand speed, such engagement causing said rotating member to rotate at a peripheral speed substantially equal to the linear speed of said strand, thus applying a forward thrust to said strand and reducing the tension on said strand.

5. Apparatus for continuously forming and winding fiber glass strand material comprising:
   means to form the strand, said means including a bushing containing molten glass having orifices through which streams of glass flow and are attenuated into fibers,
   means to apply a binder to said fibers and means to gather said fibers together as a strand,
   means to attenuate and to wind said fibers and strand, said attenuating and winding means including a pair of cylindrical surfaces onto which the strand is successively wound in a plurality of superimposed layers,
   each cylindrical surface comprising a rigid tube,
   means mounting said cylindrical winding surfaces for rotary movement,
   means for driving said cylindrical winding surfaces,
   said means for driving said cylindrical surfaces comprise pairs of hubs axially aligned with each other, at least one of said hubs being mechanically driven, said hubs being connected to each end of said rigid tubes,
   means to engage said strand before it is wound on said cylindrical winding surfaces to reduce the tension on said strand,
   traversing means for traversing said strand onto said cylindrical winding surfaces,
   means for delivering said strand to said traversing means,
   means for reciprocating said traversing means in a path parallel to the axis of rotation of said cylindrical winding surfaces,
   and means for reciprocating said strand delivering means in a path parallel to the axis of rotation of said cylindrical winding surfaces and in coordination with the reciprocation of said traversing means.

6. The apparatus of claim 5 further including means to transfer strand from one of said cylindrical winding surfaces to another cylindrical winding surface, and
   means to disengage said strand and said strand tension-reducing means when said strand is transferred.

7. A method of initiating a fiber glass forming and winding operation on a closed-end strand collecting surface upon which the strand is to be wound in the form of a package, which comprises:
   gathering the strand,
   drawing the strand across a portion of the strand collecting surface,
   engaging the strand with a device which attenuates the strand at a linear speed less than that required for winding the desired package of strand and greater than the linear peripheral speed of the strand collecting surface to initiate attenuation of the strand,
   accelerating the peripheral speed of said strand collecting surface to a speed greater than the linear speed imparted to the strand by said strand attenuation initiating device to cause the strand to break and begin winding on said strand collecting surface, and thereafter,
   rotating the said strand collecting surface at the speed necessary to attenuate and wind the desired package of fiber glass strand.

8. In a method of forming and winding glass fibers which includes the steps of flowing a plurality of streams of molten glass from orifices in a bushing, attenuating said streams to form filaments, applying a binder to said filaments and grouping said filaments together to form a strand which is collected as a package, the improvement which comprises:
   applying an attenuating force to said fibers which is composed of a primary force of one magnitude and a secondary force of a different and lesser magnitude,
   said primary force being provided by a rotating surface upon which said strand is collected as said package,
   said secondary force being provided by engaging said strand with a rotating surface rotating at a no-load peripheral speed in excess of the linear speed of said strand,
   said secondary force applying a forward thrust to said strand before it is wound as said package.

9. A method as in claim 8 wherein said primary force maintains a substantially constant strand speed throughout the winding operation.

References Cited

UNITED STATES PATENTS

| | | |
|---|---|---|
| 2,255,426 | 9/1941 | Lamesch. |
| 2,622,810 | 12/1952 | Stream et al. |
| 3,244,383 | 4/1966 | Ballmer et al. |
| 3,265,476 | 8/1966 | Roberson. |
| 3,273,985 | 9/1966 | Small et al. |
| 3,279,904 | 10/1966 | Russell et al. |
| 3,281,224 | 10/1966 | Lowe. |
| 3,293,013 | 12/1966 | Drummond _____ 65—2 |

S. LEON BASHORE, Primary Examiner

R. L. LINDSAY, Jr., Assistant Examiner

U.S. Cl. X.R.

65—11; 242—18; 226—168